(12) United States Patent
Guo et al.

(10) Patent No.: US 12,317,361 B2
(45) Date of Patent: May 27, 2025

(54) DATA TRANSMISSION METHOD AND APPARATUS

(71) Applicant: HUAWEI TECHNOLOGIES CO., LTD., Shenzhen (CN)

(72) Inventors: Longhua Guo, Shanghai (CN); Li Hu, Shanghai (CN); He Li, Shanghai (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 389 days.

(21) Appl. No.: 17/695,140

(22) Filed: Mar. 15, 2022

(65) Prior Publication Data
US 2022/0210859 A1 Jun. 30, 2022

Related U.S. Application Data

(63) Continuation of application No. PCT/CN2019/106036, filed on Sep. 16, 2019.

(51) Int. Cl.
*H04W 76/25* (2018.01)
*H04L 9/32* (2006.01)
(Continued)

(52) U.S. Cl.
CPC .......... *H04W 76/25* (2018.02); *H04L 9/3242* (2013.01); *H04W 12/03* (2021.01); *H04W 60/04* (2013.01)

(58) Field of Classification Search
CPC ..... H04W 76/25; H04W 12/03; H04W 60/04; H04W 12/037; H04W 12/08;
(Continued)

(56) References Cited

U.S. PATENT DOCUMENTS

2009/0170426 A1* 7/2009 Jung .................. H04W 8/24
455/7
2014/0068709 A1 3/2014 Xu et al.
(Continued)

FOREIGN PATENT DOCUMENTS

CN 101888684 A 11/2010
CN 103686695 A 3/2014
(Continued)

OTHER PUBLICATIONS

3GPP, "3GPP TS 23.502 V16.0.2", 3rd Generation Partnership Project Technical Specification Group Services and System Aspects Procedures for the 5G System Stage 2(Release 16), Apr. 30, 2019,total 419 pages.
(Continued)

*Primary Examiner* — Jamal Javaid
*Assistant Examiner* — Shawn D Miller
(74) *Attorney, Agent, or Firm* — HAUPTMAN HAM, LLP

(57) ABSTRACT

Embodiments of this application relate to the field of communication technologies, and provide a data transmission method and an apparatus, to ensure security of radio capability information of a terminal in a transmission process. The method includes: A terminal performs NAS security protection on radio capability information based on a NAS security context before establishing an AS security context; then the terminal sends the NAS-security-protected radio capability information to a mobility management network element; and after receiving the NAS-security-protected radio capability information, the mobility management network element performs security deprotection on the NAS-security-protected radio capability information, to obtain and store the radio capability information of the terminal. In this way, in a scenario in which an access network device
(Continued)

requires the radio capability information of the terminal, the mobility management network element may send the radio capability information to the access network device.

14 Claims, 16 Drawing Sheets

(51) Int. Cl.
*H04W 12/03* (2021.01)
*H04W 60/04* (2009.01)

(58) Field of Classification Search
CPC .... H04W 12/106; H04W 8/24; H04L 9/3242; H04L 63/205; H04L 9/40
See application file for complete search history.

(56) References Cited

U.S. PATENT DOCUMENTS

| | | | |
|---|---|---|---|
| 2016/0029258 A1 | 1/2016 | Suh et al. | |
| 2018/0167915 A1* | 6/2018 | Lee | H04W 72/23 |
| 2019/0215686 A1* | 7/2019 | Malkamaki | G06F 21/606 |
| 2020/0053602 A1* | 2/2020 | Kadiri | H04W 48/18 |
| 2021/0029618 A1* | 1/2021 | Jain | H04W 48/02 |

FOREIGN PATENT DOCUMENTS

| | | |
|---|---|---|
| CN | 106961703 A | 7/2017 |
| CN | 108464054 A | 8/2018 |
| CN | 108476444 A | 8/2018 |
| CN | 109246684 A | 1/2019 |
| EP | 3474625 A1 | 4/2019 |
| WO | 2018174995 A1 | 9/2018 |

OTHER PUBLICATIONS

Qualcomm Incorporated, "3GPP TSG-SA WG2 Meeting #133 S2-1906388", Assignment of UE Radio Capability ID using NAS, May 17, 2019,total 19 pages.
Altaf Shaik et al:"New vulnerabilities in 4G and 5G cellular access network protocols : exposing device capabilities",May 15, 2019,total 12 pages.
3GPP TS 23.401 V16.4.0: 3rd Generation Partnership Project; Technical Specification Group Services and System Aspects;General Packet Radio Service (GPRS) enhancements for Evolved Universal Terrestrial Radio Access Network (E-UTRAN) access(Release 16), Sep. 2019,total 423 pages.
3GPP TS 36.306 V15.5.0:"3rd Generation Partnership Project; Technical Specification Group Radio Access Network;Evolved Universal Terrestrial Radio Access (E-UTRA);User Equipment (UE) radio access capabilities(Release 15)," Jun. 2019,total 120 pages.
3GPP TS 36.331 V15.6.0 (Jun. 2019), 3rd Generation Partnership Project; Technical Specification Group Radio Access Network; Evolved Universal Terrestrial Radio Access (E-UTRA); Radio Resource Control (RRC); Protocol specification (Release 15), 960 pages.
3GPP TS 36.413 V15.6.0 (Jul. 2019);3rd Generation Partnership Project;Technical Specification Group Radio Access Network;Evolved Universal Terrestrial Radio Access Network(E-UTRAN);S1 Application Protocol (S1AP)(Release 15);total 388 pages.
International Search Report issued in corresponding International Application No. PCT/CN2019/106036, dated Jun. 22, 2020, pp. 1-12.
Ericsson: "Solution#?—further updates", 3GPP Draft; S2-1811904_PCR_23743_SOL7V4, Nov. 20, 2018, XP051563431, total 5 pages.
"3rd Generation Partnership Project; Technical Specification Group Services and System Aspects; Study on the security aspects of the next generation system (Release 14)" 3GPP Draft; 33899-V1.3.0, Sep. 24, 2017, XP051360868, total 604 pages.
Mediatek Inc: "NB-IoT latency evaluation towards NR mMTC", 3GPP Draft; R1-1702747 NB-IoT Latency Evaluation Towards NR MMTC, Feb. 7, 2017, XP051221587, total 5 pages.
Extended European Search Report issued in corresponding European Application No. 19945845.6, dated Jul. 18, 2022, pp. 1-9.
Huawei, Hisilicon, China Mobile, Discussion paper on UE radio capability protection for UEs without AS security. 3GPP TSG SA WG3 Meeting #98e, e-meeting, Mar. 2-6, 2020, S3-200265, 4 pages.
Intel Corporation, UE capability signalling of supported data rate for DRB integrity protection. 3GPP TSG-RAN WG2 Meeting #102, Busan, Korea, May 21-25, 2018, R2-1807346, 4 pages.
Ericsson, Security of RRC UE capability transfer procedure in 5GS. 3GPP TSG-SA WG3 Meeting #96 , Wroclaw (Poland), Aug. 26-30, 2019, S3-192862, 2 pages.
Chinese Office Action issued in corresponding Chinese Application No. 201980096565.5, dated May 26, 2022, pp. 1-14.

* cited by examiner

DATA TRANSMISSION METHOD AND APPARATUS

CROSS-REFERENCE TO RELATED APPLICATIONS

This application is a continuation of International Patent Application No. PCT/CN2019/106036, filed on Sep. 16, 2019, the disclosure of which is hereby incorporated by reference in its entirety.

TECHNICAL FIELD

This application relates to the field of communication technologies, and in particular, to a data transmission method and an apparatus.

BACKGROUND

A security protection mechanism is introduced into a mobile communication network defined by the 3rd generation partnership project (3rd generation partnership project, 3GPP), to ensure security (for example, communication confidentiality and integrity) of mobile communication. After an access stratum (access stratum, AS) security context is established between a terminal and a base station, the terminal may perform AS security protection on some private data (for example, radio capability information) using the AS security context, and send the AS-security-protected private data to the base station, so that the network side learns the private data of the terminal.

Currently, in some scenarios, no security context is established between the terminal and the base station. As a result, the terminal cannot perform AS security protection on the private data, and the terminal can only transmit the AS-security-protected private data to the base station. In this case, the private data is subject to attackers' theft or tampering, resulting in security risks in the communication network.

SUMMARY

This application provides a data transmission method and an apparatus, to ensure security of private data of a terminal in a transmission process.

According to a first aspect, a communication system is provided, including an access network device and a mobility management network element. The access network device is configured to send non-access stratum (non-access stratum, NAS)-security-protected private data from the terminal to the mobility management network element before a terminal establishes an AS context with the access network device; and receive the private data from the mobility management network element. The mobility management network element is configured to receive the NAS-security-protected private data from the terminal; and send, to the access network device, the private data obtained by performing security deprotection on the NAS-security-protected private data.

Based on the foregoing technical solution, before the terminal establishes the AS security context with the access network device, the terminal sends the NAS-security-protected private data, so that the network side can learn of the private data of the terminal. In addition, the private data of the terminal is NAS security protected, so that security of the private data of the terminal can be ensured in a transmission process.

In a possible design, the NAS-security-protected private data is carried in a first NAS message sent by the terminal, and the first NAS message is NAS security protected.

In a possible design, the first NAS message is an initial NAS message or a NAS SMP message.

In a possible design, when the first NAS message is the initial NAS message, non-plaintext information in the initial NAS message includes the private data.

In a possible design, the mobility management network element is further configured to send a NAS-security-protected second NAS message to the terminal, where the second NAS message is used to indicate that the mobility management network element has received the first NAS message.

In a possible design, the access network device is further configured to: when determining that the terminal is a first-type terminal, send a second request message to the mobility management network element, where the second request message is used to request the private data from the mobility management network element; and the mobility management network element is further configured to receive the second request message.

In a possible design, the access network device is further configured to determine that the terminal is the first-type terminal.

In a possible design, that the access network device is further configured to determine that the terminal is the first-type terminal is specifically: The access network device determines, based on a cell accessed by the terminal, that the terminal is the first-type terminal; the access network device determines, based on a message sent by the terminal, that the terminal is the first-type terminal; or the access network device determines, based on a network capability indication of the terminal, that the terminal is the first-type terminal.

In a possible design, the first-type terminal is a CP-optimized NB-IoT terminal or a CP-optimized CIoT terminal.

In a possible design, the access network device is further configured to: when determining that the terminal is the first-type terminal, skip sending a first request message to the terminal, where the first request message is used to request the private data from the terminal.

In a possible design, the mobility management network element is further configured to: when no valid private data is stored, send a NAS-security-protected third NAS message to the terminal, where the third NAS message is used to request the NAS-security-protected private data from the terminal.

In a possible design, the access network device is further configured to receive a first RRC message from the terminal, where the first RRC message includes a NAS container, and the NAS container includes encrypted private data and uplink NAS MAC; and send the NAS container to the mobility management network element; and the mobility management network element is specifically configured to receive the NAS container.

According to a second aspect, a data transmission method is provided. The method includes: A terminal performs NAS security protection on private data based on a prestored NAS security context before establishing an AS security context; and the terminal sends the NAS-security-protected private data.

Based on the foregoing technical solution, the terminal sends the NAS-security-protected private data before establishing the AS security context with an access network device, so that the network side can learn of the private data of the terminal. In addition, the private data of the terminal is NAS security protected, so that security of the private data of the terminal can be ensured in a transmission process.

In a possible design, that a terminal performs NAS security protection on private data based on a prestored NAS security context before establishing an AS security context includes: A NAS layer of the terminal obtains the private data from an RRC layer of the terminal; and the NAS layer of the terminal performs NAS security protection on the private data based on the prestored NAS security context.

In a possible design, that the terminal sends the NAS-security-protected private data includes: The terminal sends a first RRC message to the access network device, where the first RRC message includes the NAS-security-protected private data.

In a possible design, that the terminal sends a first RRC message to the access network device includes: The RRC layer of the terminal obtains the NAS-security-protected private data from the NAS layer of the terminal; and the RRC layer of the terminal sends the first RRC message to the access network device, where the first RRC message includes the NAS-security-protected private data.

In a possible design, that the first RRC message includes the NAS-security-protected private data is specifically implemented as follows: The first RRC message includes a NAS container, where the NAS container includes encrypted private data and uplink NAS MAC; or the NAS container includes unencrypted private data and uplink NAS MAC.

In a possible design, the NAS-security-protected private data is carried in a first NAS message sent by the terminal, and the first NAS message is NAS security protected.

In a possible design, the first NAS message is an initial NAS message or a NAS SMP message.

In a possible design, when the first NAS message is the initial NAS message, a non-plaintext information element in the initial NAS message includes the private data.

In a possible design, the method further includes: The terminal receives a NAS-security-protected second NAS message that is sent by a mobility management network element, where the second NAS message is used to indicate that the mobility management network element has received the first NAS message.

In a possible design, the method further includes: The terminal receives a NAS-security-protected third NAS message that is sent by the mobility management network element, where the third NAS message is used to request, from the terminal, the NAS-security-protected private data.

In a possible design, the terminal is a first-type terminal, and no AS security context is established between the first-type terminal and the access network device.

In a possible design, the first-type terminal is a CP-optimized NB-IoT terminal or a CP-optimized CIoT terminal.

According to a third aspect, a data transmission method is provided. The method includes: A mobility management network element receives NAS-security-protected private data; and the mobility management network element performs security deprotection on the NAS-security-protected private data based on a prestored NAS security context, and stores the private data.

Based on the foregoing technical solution, a terminal sends the NAS-security-protected private data, so that the network side can learn of the private data of the terminal. In addition, the private data of the terminal is NAS security protected, so that security of the private data of the terminal can be ensured in a transmission process.

In a possible design, the NAS-security-protected private data is carried in a first NAS message sent by the terminal, and the first NAS message is NAS security protected.

In a possible design, the first NAS message is an initial NAS message or a NAS SMP message.

In a possible design, when the first NAS message is the initial NAS message, a non-plaintext information element in the initial NAS message includes the private data.

In a possible design, the method further includes: The mobility management network element sends a NAS-security-protected second NAS message to the terminal, where the second NAS message is used to indicate that the mobility management network element has received the first NAS message.

In a possible design, the method further includes: The mobility management network element receives a second request message sent by an access network device, where the second request message is used to request the mobility management network element to send the private data to the access network device; and the mobility management network element sends the private data to the access network device.

In a possible design, before the mobility management network element sends the private data to the access network device, the method further includes: If the mobility management network element stores no valid private data, the mobility management network element sends a third NAS message to the terminal, where the third NAS message is used to request the NAS-security-protected private data from the terminal.

In a possible design, that a mobility management network element receives NAS-security-protected private data includes: The mobility management network element receives a NAS container sent by an access network device, where the NAS container includes encrypted private data and uplink NAS MAC; or the NAS container includes unencrypted private data and uplink NAS MAC.

In a possible design, the method further includes: After performing security deprotection on the NAS container, the mobility management network element sends the private data to the access network device.

In a possible design, when the NAS container includes the unencrypted private data and the uplink NAS MAC, the method further includes: The mobility management network element performs integrity check on the uplink NAS MAC; and after the uplink NAS MAC is successfully integrity checked, the mobility management network element sends a check success message to the access network device, where the check success message is used to indicate that the uplink NAS MAC is successfully integrity checked.

According to a fourth aspect, a data transmission method is provided. The method includes: When determining that a terminal is a first-type terminal, an access network device sends a second request message to a mobility management network element, where the second request message is used to request, from the mobility management network element, private data of the terminal; and the access network device receives the private data sent by the mobility management network element.

Based on the foregoing technical solution, when determining that the terminal is the first-type terminal, the access network device requests, from the mobility management network element, the private data of the terminal, to prevent the terminal from sending private data which is not AS security protected, so as to prevent the private data from attacker's theft or tampering, and ensure security of a communication network.

In a possible design, the method further includes: When determining that the terminal is the first-type terminal, the access network device skips sending a first request message to the terminal, where the first request message is used to request the private data from the terminal.

In a possible design, the method further includes: When the terminal accesses a first-type cell, the access network device determines that the terminal is the first-type terminal, where the first-type cell is a cell accessed by the first-type terminal; when a message sent by the terminal is a first-type message, the access network device determines that the terminal is the first-type terminal, where the first-type message is a message sent by the first-type terminal; when a network capability of the terminal indicates that the terminal is the first-type terminal, the access network device determines that the terminal is the first-type terminal; or when receiving second indication information sent by the terminal, the access network device determines that the terminal is the first-type terminal, where the second indication information is used to indicate that the terminal is the first-type terminal.

In a possible design, the first-type terminal is a CP-optimized NB-IoT terminal or a CP-optimized CIoT terminal.

According to a fifth aspect, a data transmission method is provided. The method includes: An access network device receives a first RRC message sent by a terminal, where the first RRC message includes NAS-security-protected private data; and the access network device sends the NAS-security-protected private data to a mobility management network element.

Based on the foregoing technical solution, a terminal sends the NAS-security-protected private data, so that the network side can learn of the private data of the terminal. In addition, the private data of the terminal is NAS security protected, so that security of the private data of the terminal can be ensured in a transmission process.

In a possible design, the method further includes: The access network device sends a first request message to the terminal, where the first request message is used to request the private data from the terminal.

In a possible design, that the first RRC message includes NAS-security-protected private data is specifically implemented as follows: The first RRC message includes a first NAS container, where the first NAS container includes encrypted private data and uplink NAS MAC; the first RRC message includes a second NAS container, where the second NAS container includes unencrypted private data and uplink NAS MAC; the first RRC message includes encrypted private data and uplink NAS MAC; or the first RRC message includes unencrypted private data and uplink NAS MAC.

In a possible design, the method further includes: The access network device receives the private data sent by the mobility management network element.

In a possible design, when the first RRC message includes the unencrypted private data and the uplink NAS MAC, the method further includes: After receiving a check success message sent by the mobility management network element, the access network device uses the private data, where the check success message is used to indicate that the uplink NAS MAC is successfully integrity checked.

According to a sixth aspect, a communication apparatus is provided, including a processing module and a communication module. The processing module is configured to perform NAS security protection on private data based on a prestored NAS security context before establishing an AS security context; and the communication module is configured to send the NAS-security-protected private data.

In a possible design, that the processing module is configured to perform NAS security protection on private data based on a prestored NAS security context before establishing an AS security context includes: A NAS layer obtains the private data from an RRC layer; and the NAS layer performs NAS security protection on the private data based on the prestored NAS security context.

In a possible design, the communication module is specifically configured to send a first RRC message to an access network device, where the first RRC message includes the NAS-security-protected private data.

In a possible design, that the communication module is specifically configured to send a first RRC message to an access network device includes: The RRC layer obtains the NAS-security-protected private data from the NAS layer; and the RRC layer sends the first RRC message to the access network device, where the first RRC message includes the NAS-security-protected private data.

In a possible design, that the first RRC message includes the NAS-security-protected private data is specifically implemented as follows: The first RRC message includes a NAS container, where the NAS container includes encrypted private data and uplink NAS MAC; or the NAS container includes unencrypted private data and uplink NAS MAC.

In a possible design, the NAS-security-protected private data is carried in a first NAS message sent by a terminal, and the first NAS message is NAS security protected.

In a possible design, the first NAS message is an initial NAS message or a NAS SMP message.

In a possible design, when the first NAS message is the initial NAS message, a non-plaintext information element in the initial NAS message includes the private data.

In a possible design, the communication module is further configured to receive a NAS-security-protected second NAS message that is sent by a mobility management network element, where the second NAS message is used to indicate that the mobility management network element has received the first NAS message.

In a possible design, the communication module is further configured to receive a NAS-security-protected third NAS message that is sent by the mobility management network element, where the third NAS message is used to request the NAS-security-protected private data from the terminal.

In a possible design, the communication apparatus is a first-type terminal, and no AS security context is established between the first-type terminal and the access network device.

In a possible design, the first-type terminal is a CP-optimized NB-IoT terminal or a CP-optimized CIoT terminal.

According to a seventh aspect, a communication apparatus is provided, including: a communication module, configured to receive NAS-security-protected private data; and a processing module, configured to perform security deprotection on the NAS-security-protected private data based on a prestored NAS security context, and store the private data.

In a possible design, the NAS-security-protected private data is carried in a first NAS message sent by a terminal, and the first NAS message is NAS security protected.

In a possible design, the first NAS message is an initial NAS message or a NAS SMP message.

In a possible design, when the first NAS message is the initial NAS message, a non-plaintext information element in the initial NAS message includes the private data.

In a possible design, the communication module is further configured to send a NAS-security-protected second NAS message to the terminal, where the second NAS message is used to indicate that a mobility management network element has received the first NAS message.

In a possible design, the communication module is further configured to receive a second request message sent by an access network device, where the second request message is used to request the mobility management network element to send the private data to the access network device; and send the private data to the access network device.

In a possible design, the communication module is further configured to: if the mobility management network element stores no valid private data, send a third NAS message to the terminal, where the third NAS message is used to request, from the terminal, the NAS-security-protected private data.

In a possible design, the communication module is specifically configured to receive a NAS container sent by an access network device, where the NAS container includes encrypted private data and uplink NAS MAC; or the NAS container includes unencrypted private data and uplink NAS MAC.

In a possible design, the processing module is configured to perform security deprotection on the NAS container; and the communication module is further configured to: after security deprotection is performed on the NAS container, send the private data to the access network device.

In a possible design, the processing module is further configured to: when the NAS container includes the unencrypted private data and the uplink NAS MAC, perform integrity check on the uplink NAS MAC; and the communication module is further configured to: after the uplink NAS MAC is successfully integrity checked, send a check success message to the access network device, where the check success message is used to indicate that the uplink NAS MAC is successfully integrity checked.

According to an eighth aspect, a communication apparatus is provided, including: a processing module, configured to determine whether a terminal is a first-type terminal; and a communication module, configured to: when the processing module determines that the terminal is the first-type terminal, send a second request message to a mobility management network element, where the second request message is used to request, from the mobility management network element, private data of the terminal; and receive the private data sent by the mobility management network element.

In a possible design, the communication module is configured to: when the processing module determines that the terminal is the first-type terminal, skip sending a first request message to the terminal, where the first request message is used to request the private data from the terminal.

In a possible design, the processing module is configured to: when the terminal accesses a first-type cell, determine that the terminal is the first-type terminal, where the first-type cell is a cell accessed by the first-type terminal; when a message sent by the terminal is a first-type message, determine that the terminal is the first-type terminal, where the first-type message is a message sent by the first-type terminal; when a network capability of the terminal indicates that the terminal is the first-type terminal, determine that the terminal is the first-type terminal; or when receiving second indication information sent by the terminal, determine that the terminal is the first-type terminal, where the second indication information is used to indicate that the terminal is the first-type terminal.

In a possible design, the first-type terminal is a CP-optimized NB-IoT terminal or a CP-optimized CIoT terminal.

According to a ninth aspect, a communication apparatus is provided, including: a receiving module, configured to receive a first RRC message sent by a terminal, where the first RRC message includes NAS-security-protected private data; and a sending module, configured to send the NAS-security-protected private data to a mobility management network element.

In a possible design, the sending module is further configured to send a first request message to the terminal, where the first request message is used to request the private data from the terminal.

In a possible design, that the first RRC message includes NAS-security-protected private data is specifically implemented as follows: The first RRC message includes a first NAS container, where the first NAS container includes encrypted private data and uplink NAS MAC; the first RRC message includes a second NAS container, where the second NAS container includes unencrypted private data and uplink NAS MAC; the first RRC message includes encrypted private data and uplink NAS MAC; or the first RRC message includes unencrypted private data and uplink NAS MAC.

In a possible design, the receiving module is further configured to receive the private data sent by the mobility management network element.

In a possible design, the communication apparatus further includes a processing module. The processing module is further configured to: when the first RRC message includes the unencrypted private data and the uplink NAS MAC, after a check success message sent by the mobility management network element is received, use the private data, where the check success message is used to indicate that the uplink NAS MAC is successfully integrity checked.

According to a tenth aspect, a communication apparatus is provided, and includes a processor and a communication interface. The processor is configured to execute computer program instructions, to enable the communication apparatus to implement the data transmission method in any possible design in any one of the second aspect to the fifth aspect.

According to an eleventh aspect, a computer-readable storage medium is provided. The computer-readable storage medium stores instructions. When the instructions are run on a computer, the computer is enabled to implement the data transmission method in any possible design in any one of the second aspect to the fifth aspect.

According to a twelfth aspect, a computer program product is provided. The computer program product includes instructions. When the computer program product runs on a computer, the computer is enabled to implement the data transmission method in any possible design in any one of the second aspect to the fifth aspect.

According to a thirteenth aspect, a chip is provided. The chip includes a processor. When the processor executes computer program instructions, the chip is enabled to implement the data transmission method in any possible design in any one of the second aspect to the fifth aspect.

According to a fourteenth aspect, a communication system is provided, including a mobility management network element and an access network device. The mobility management network element is configured to receive a tracking area update TAU request message, where the TAU request message is used to request to update a tracking area; and when no valid private data is stored, send a TAU response message and an AS security protection parameter to the access network device, where the TAU response message is used to respond to the TAU request message, and the AS security protection parameter is used to establish an AS security context between a terminal and the access network device. The access network device is configured to receive the TAU response message and the AS security protection parameter; establish the AS security context with the terminal based on the AS security protection parameter; send a first request message to the terminal, where the first request message is used to request the terminal to send the private data to the access network device; and receive a first response message sent by the terminal, where the first response message includes AS-security-protected private data.

Based on the foregoing technical solution, in a TAU procedure, the mobility management network element sends the AS security protection parameter to the access network device, so that the AS security context can be established between the access network device and the terminal, to ensure that only the AS-security-protected private data of the terminal is transmitted. This can prevent the private data of the terminal from attacker's theft or tampering, and ensure security of a communication network.

In a possible design, the access network device is further configured to perform security deprotection on the AS-security-protected private data based on the AS security context; and after successfully performing security deprotection on the AS-security-protected private data, use the private data.

In a possible design, the access network device is further configured to send fourth indication information to the mobility management network element, where the fourth indication information is used to indicate that the access network device requires the private data of the terminal. The mobility management network element is further configured to receive the fourth indication information.

According to a fifteenth aspect, a data transmission method is provided. The method includes: A mobility management network element receives a tracking area update TAU request message, where the TAU request message is used to request to update a tracking area; and when no private data of a terminal is stored, the mobility management network element sends a TAU response message and an AS security protection parameter to an access network device, where the TAU response message is used to respond to the TAU request message, and the AS security protection parameter is used to establish an AS security context between the terminal and the access network device.

Based on the foregoing technical solution, in a TAU procedure, the mobility management network element sends the AS security protection parameter to the access network device, so that the AS security context can be established between the access network device and the terminal, to ensure that only the AS-security-protected private data of the terminal is transmitted. This can prevent the private data of the terminal from attacker's theft or tampering, and ensure security of a communication network.

In a possible design, the method further includes: The mobility management network element receives fourth indication information, where the fourth indication information is used to indicate that the access network device requires the private data of the terminal.

According to a sixteenth aspect, a data transmission method is provided. The method includes: An access network device sends, to a mobility management network element, a tracking area update TAU request message from a terminal, where the TAU request message is used to request to update a tracking area; the access network device receives a TAU response message and an AS security protection parameter that are sent by the mobility management network element, where the TAU response message is used to respond to the TAU request message, and the AS security protection parameter is used to establish an AS security context between the terminal and the access network device; the access network device establishes the AS security context with the terminal based on the AS security protection parameter; the access network device sends a first request message to the terminal, where the first request message is used to request the terminal to send private data to the access network device; and the access network device receives a first response message sent by the terminal, where the first response message includes AS-security-protected private data.

Based on the foregoing technical solution, in a TAU procedure, the mobility management network element sends the AS security protection parameter to the access network device, so that the AS security context can be established between the access network device and the terminal, to ensure that only the AS-security-protected private data of the terminal is transmitted. This can prevent the private data of the terminal from attacker's theft or tampering, and ensure security of a communication network.

In a possible design, the method further includes: The access network device sends fourth indication information to the mobility management network element, where the fourth indication information is used to indicate that the access network device requires the private data of the terminal.

According to a seventeenth aspect, a communication apparatus is provided, including: a receiving module and a sending module. The receiving module is configured to receive a tracking area update TAU request message, where the TAU request message is used to request to update a tracking area. The sending module is configured to: when no valid private data is stored, send a TAU response message and an AS security protection parameter to an access network device, where the TAU response message is used to respond to the TAU request message, and the AS security protection parameter is used to establish an AS security context between a terminal and the access network device.

In a possible design, the receiving module is further configured to receive fourth indication information, where the fourth indication information is used to indicate that the access network device requires the private data of the terminal.

According to an eighteenth aspect, a communication apparatus is provided, including: a sending module, a receiving module, and an establishment module. The sending module is configured to send, to a mobility management network element, a tracking area update TAU request message from a terminal, where the TAU request message is used to request to update a tracking area. The receiving module is configured to receive a TAU response message and an AS security protection parameter that are sent by the mobility management network element, where the TAU response message is used to respond to the TAU request message, and the AS security protection parameter is used to establish an AS security context between the terminal and an access network device. The establishment module is configured to establish the AS security context with the terminal based on the AS security protection parameter. The sending module is further configured to send a first request message to the terminal, where the first request message is used to request the terminal to send private data to the access network device. The receiving module is further configured to receive a first response message sent by the terminal, where the first response message includes AS-security-protected private data.

In a possible design, the sending module is further configured to send fourth indication information to the mobility management network element, where the fourth indication information is used to indicate that the access network device requires the private data of the terminal.

According to a nineteenth aspect, a communication apparatus is provided, including a processor and a communication interface. The processor is configured to execute computer program instructions, to enable the communication apparatus to implement the data transmission method in any possible design in the fifteenth aspect or the sixteenth aspect.

According to a twentieth aspect, a computer-readable storage medium is provided. The computer-readable storage medium stores instructions. When the instructions are run on a computer, the computer is enabled to implement the data transmission method in any possible design in the fifteenth aspect or the sixteenth aspect.

According to a twenty-first aspect, a computer program product is provided. The computer program product includes instructions. When the computer program product runs on a computer, the computer is enabled to implement the data transmission method in any possible design in the fifteenth aspect or the sixteenth aspect.

According to a twenty-second aspect, a chip is provided. The chip includes a processor. When the processor executes computer program instructions, the chip is enabled to implement the data transmission method in any possible design in the fifteenth aspect or the sixteenth aspect.

BRIEF DESCRIPTION OF DRAWINGS

FIG. 5(*b*) is a schematic diagram of an architecture of a 5G network according to an embodiment of this application;

FIG. 13(*b*) is another flowchart of another data transmission method according to an embodiment of this application;

DESCRIPTION OF EMBODIMENTS

Figure 1:
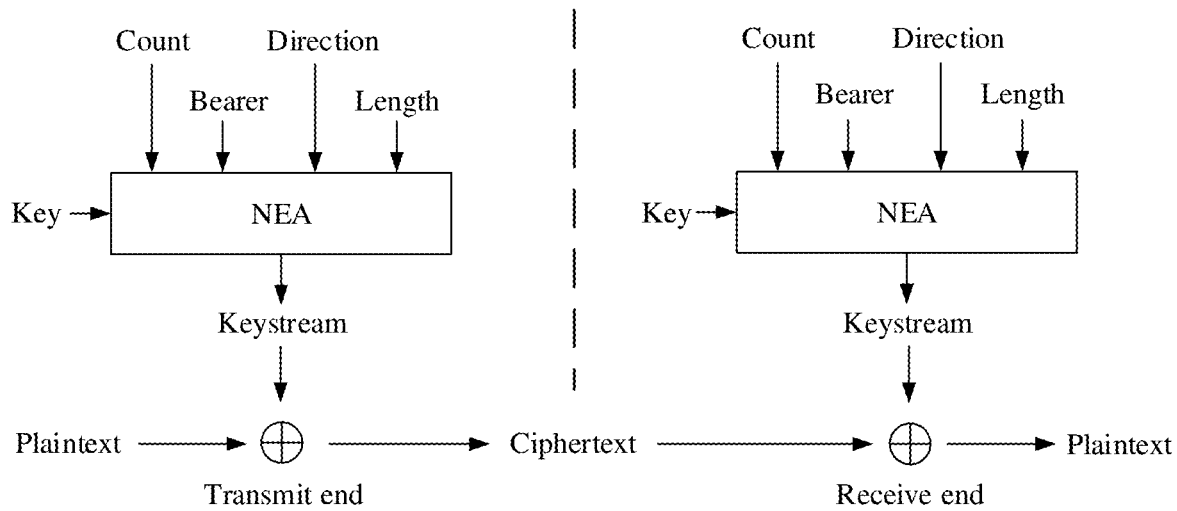
FIG. 1 is a schematic diagram of an encryption/decryption process.

In descriptions of this application, unless otherwise specified, "/" means "or". For example, A/B may represent A or B. The term "and/or" in this specification describes only an association relationship for describing associated objects and represents that three relationships may exist. For example, A and/or B may represent the following three cases: Only A exists, both A and B exist, and only B exists. In addition, "at least one" means one or more, and "a plurality of" means two or more. Terms such as "first" and "second" do not limit a quantity or an execution sequence, and the terms such as "first" and "second" do not indicate a definite difference.

It should be noted that in this application, the word such as "example" or "for example" is used to represent giving an example, an illustration, or a description. Any embodiment or design solution described by using "example" or "for example" in this application shall not be construed as being more preferred or more advantageous than another embodiment or design solution. Exactly, use of the word such as "example" or "for example" is intended to present a related concept in a specific manner.

In the descriptions of this application, the "indication" may include a direct indication and an indirect indication, or may include an explicit indication and an implicit indication. Information indicated by a piece of information (first indication information described below) is referred to as to-be-indicated information. In a specific implementation process, there are a plurality of manners of indicating the to-be-indicated information. For example, the to-be-indicated information may be directly indicated, where the to-be-indicated information, an index of the to-be-indicated information, or the like is indicated. For another example, the to-be-indicated information may be indirectly indicated by indicating other information, and there is an association relationship between the other information and the to-be-indicated information. For another example, only a part of the to-be-indicated information may be indicated, and the other part of the to-be-indicated information is already known or pre-agreed on. In addition, specific information may also be indicated by using a pre-agreed (for example, stipulated in a protocol) arrangement sequence of various pieces of information, to reduce indication overheads to some extent.

To facilitate understanding of technical solutions in this application, the following first briefly describes terms in this application.

1. Encryption/Decryption

Encryption/decryption is used to protect confidentiality of data during transmission (also referred to as confidentiality protection), where confidentiality protected content is available only to authorized users. Usually, encryption protection means to encrypt data using a key and an encryption algorithm. For a specific encryption protection method, refer to section 8.2 in 3GPP TS 33.401 f50 or section 6.4.4 in 33.501 f50. Details are not described herein.

For example, as shown in FIG. 1, an encryption process at a transmit end may be as follows: The transmit end may input parameters such as a count (count), a length (length), a bearer (bearer), and a direction (direction) into an NEA, to determine a keystream (keystream); and determines a ciphertext (ciphertext) based on the keystream and a plaintext (plaintext).

For example, as shown in FIG. 1, a decryption process at a receive end may be as follows: The receive end may input parameters such as a count, a length, a bearer, and a direction into an NEA, to determine a keystream; and determines a plaintext based on the keystream and a ciphertext.

2. Integrity Protection/Check

Integrity protection/check is used to determine whether content of a message is modified during transmission, and may also be used for identity authentication to determine a source of the message. Integrity check and protection require message authentication code (message authentication code, MAC). For a specific method for the integrity check and protection, refer to section 8.1 in the 3rd generation partnership project (3rd generation partnership project, 3GPP) TS 33.401 f50 or section 6.4.3 in 33.501 f50. Details are not described herein again.

The MAC may be used to check whether content of a message is modified during transmission, and may also be used for identity authentication to determine a source of the message.

Figure 2:
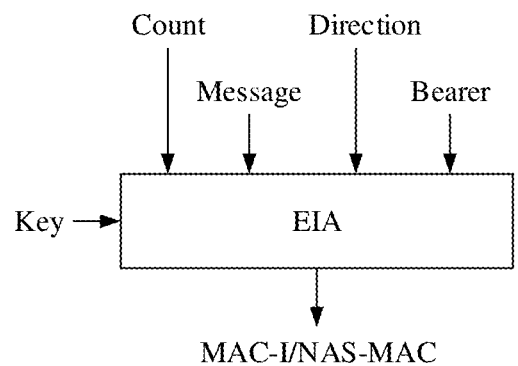
FIG. 2 is a schematic diagram of calculating MAC by a transmitter.

As shown in FIG. 2, a transmit end inputs parameters such as a key (key), a count (count), a length (length), a bearer (bearer), a message (message), and a direction (direction) into an evolved packet system integrity algorithm (evolved packet system integrity algorithm, EIA), to obtain message authentication code for integrity (message authentication code integrity, MAC-I) or NAS MAC.

Figure 3:
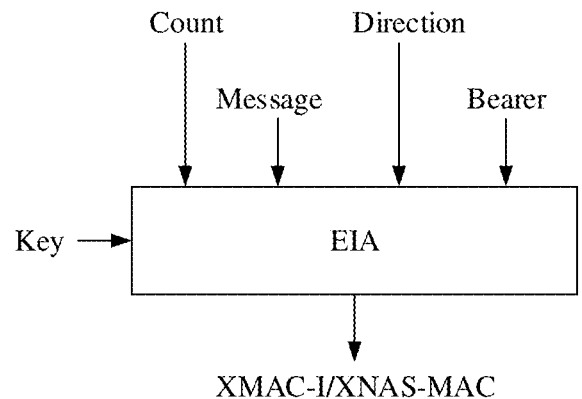
FIG. 3 is a schematic diagram of calculating MAC by a receiver.

As shown in FIG. 3, a receive end inputs parameters such as an integrity protection key, a count, a length, a bearer, a message, and a direction into an EIA, to obtain expected message authentication code for integrity (expected message authentication code integrity, XMAC-I) or expected non-access stratum message authentication code (expected non-access stratum message authentication code, XNAS MAC).

The receive end may compare a received MAC-I with the XMAC-I generated by the receive end, to check integrity of a message. If the MAC-I is the same as the XMAC-I, the receive end determines that check on the received MAC-I succeeds, and the receive end can determine that the message sent by the transmit end is complete. If the MAC-I is different from the XMAC-I, the receive end can determine that check on the received MAC-I fails, and the receive end can determine that the message sent by the transmit end is incomplete.

3. Security Context

The security context is information for security protection (for example, encryption/decryption, and/or integrity protection/check) of data.

The security context may include one or more of the following: a root key, an encryption key, an integrity protection key, a specific parameter (such as a NAS count), a key set identifier (key set identifier, KSI), a security algorithm, a security indication (for example, an indication indicating whether encryption is enabled, an indication indicating whether integrity protection is enabled, an indication indicating a validity period of a key, or a key length), or the like.

The encryption key is a parameter input by a transmit end when the transmit end encrypts a plaintext using an encryption algorithm to generate a ciphertext. If a symmetric encryption method is used, the encryption key is the same as a decryption key. A receive end may decrypt the ciphertext using the same encryption algorithm and encryption key. In other words, the transmit end and the receive end may perform encryption and decryption using a same key.

The integrity protection key is a parameter input by the transmit end when the transmit end performs integrity protection on a plaintext or a ciphertext using an integrity protection algorithm. The receive end may perform integrity check on integrity protected data using the same integrity protection algorithm and integrity protection key.

The specific parameter (for example, the NAS count) is a parameter input by the transmit end when the transmit end performs replay protection on a plaintext or a ciphertext using a replay protection algorithm. The receive end may perform replay check on replay protected data using the same replay protection algorithm.

The security algorithm is an algorithm used to perform security protection on data, such as an encryption algorithm, a decryption algorithm, and an integrity protection algorithm.

In embodiments of this application, the security context may include a NAS security context and an AS security context. It may be understood that the NAS security context is used to protect information transmitted between a terminal and a core network. The AS security context is used to protect information transmitted between the terminal and a base station.

4. Initial NAS Message

The initial NAS message is the $1^{st}$ NAS message sent when a terminal changes from an idle (IDLE) state to a connected (CONNECTED) state. It should be noted that the terminal does not establish a radio resource control (radio resource control, RRC) connection to a network side when the terminal is in the idle state, and the terminal establishes an RRC connection to the network side when the terminal is in the connected state.

In an actual application scenario, the initial NAS message may be a registration request message, a service request message, a deregistration request message, or the like. This is not limited in embodiments of this application.

In a 5G network, when a ciphering mechanism is partly introduced, the initial NAS message includes cleartext (cleartext) information and non-cleartext (non-cleartext) information. The cleartext information is information that does not need to be encrypted, and the non-cleartext information is information that needs to be encrypted. It should be noted that the non-cleartext information may also be referred to as encrypted information or ciphertext information.

Optionally, the cleartext information includes at least one of the following information elements: an extended protocol discriminator (extended protocol discriminator), a security header type (security header type), a spare half octet (spare half octet), a registration request message identity (registration request message identity), a 5G system registration type (5G system registration type), a next generation key set identifier (next generation key set identifier, ngKSI), a 5G system mobile identity (5G system mobile identity, 5GS mobile identity), a UE security capability (UE security capability), an additional globally unique temporary UE identity (additional globally unique temporary UE identity, additional GUTI), a UE status (UE status), and an evolved packet system (evolved packet system, EPS) NAS message container (NAS message container).

Optionally, the non-cleartext information includes at least one of the following information elements: a 5G mobility management capability (5GMM capability), a payload container (payload container), user plane data, and the like. The non-cleartext information may be an information element other than the cleartext information in the initial NAS message.

It should be noted that when the terminal stores a NAS security context, the information in the initial NAS message is encryption and integrity protected.

It should be noted that when no NAS security context is established between the terminal and a core network, the cleartext information in the initial NAS message is used to establish the NAS security context. After the NAS security context is established, the terminal sends a NAS-security-protected NAS security mode complete (security mode complete, SMP) message, where the NAS SMP message carries the cleartext information and the non-cleartext information that should be originally sent in the initial NAS message.

5. NAS Count

The NAS count includes an overflow counter (overflow counter) and a sequence number (sequence number). Optionally, if the NAS count includes 24 bits (bits), the overflow counter includes 16 bits, and the sequence number includes 8 bits. When security protection is performed by using the NAS count, the NAS count may be padded to 32 bits, where 8 bits including all zeros are padded before the original 24 bits of the NAS count.

The NAS count is used to count NAS messages transmitted between a network side and a terminal. The NAS count may be classified as an uplink NAS count or a downlink NAS count.

The uplink NAS count is used to count NAS messages sent by the terminal to the network side. For example, each time the terminal sends a NAS message to a core network device, the uplink NAS count is increased by 1.

The downlink NAS count is used to count NAS messages sent from the network side to the terminal. For example, each time the core network device sends a NAS message to the terminal, the downlink NAS count is increased by 1.

6. Private Data of a Terminal

In embodiments of this application, the private data of the terminal is data that needs to be transmitted using AS signaling in a conventional technology, and the data is generated by the terminal and used for reference and usage by a base station and a core network device. In addition, the private data of the terminal needs to be AS security protected, to ensure security of the private data in a transmission process.

For example, the private data of the terminal may be radio capability (radio capability) information, network slice selection assistance information (Network Slice Selection Assistance Information, NSSAI), a closed access group identifier (closed access group identifier, CAG-ID), or the like. Embodiments of this application are not limited thereto.

The radio capability information may be used to indicate information about a radio access technology supported by the terminal. For example, the radio capability information may include one or more of the following parameters: a power level, a frequency band, a network version supported by the terminal, and the like. For the radio capability information, refer to 3GPP TS 36.306 or TS 23.401. Details are not described herein. The radio capability information may have another name, for example, a UE radio access capability (UE radio access capability). This is not limited in embodiments of this application.

The NSSAI includes a plurality of pieces of single NSSAI (single NSSAI, S-NSSAI). An S-NSSAI includes a service type (slice/service type, SST) and a slice differentiator (slice differentiator, SD). The SST includes a standardized type and an operator-specific type. The SD is optional information for supplementing the SST, to differentiate among a plurality of network slices of the same SST.

The CAG-ID is used to indicate a private access group supported by the terminal.

7. Tracking Area Update (Tracking Area Update, TAU)

When a terminal moves from a tracking area (tracking area, TA) to another TA, the terminal needs to register its location in the new TA, to notify a core network to change its location information stored in the core network. This process is referred to as a TAU procedure.

It should be noted that coverage of a communication system may be divided into a plurality of TAs. The TA is a basic unit for location update and paging in the communication system.

Figure 4:
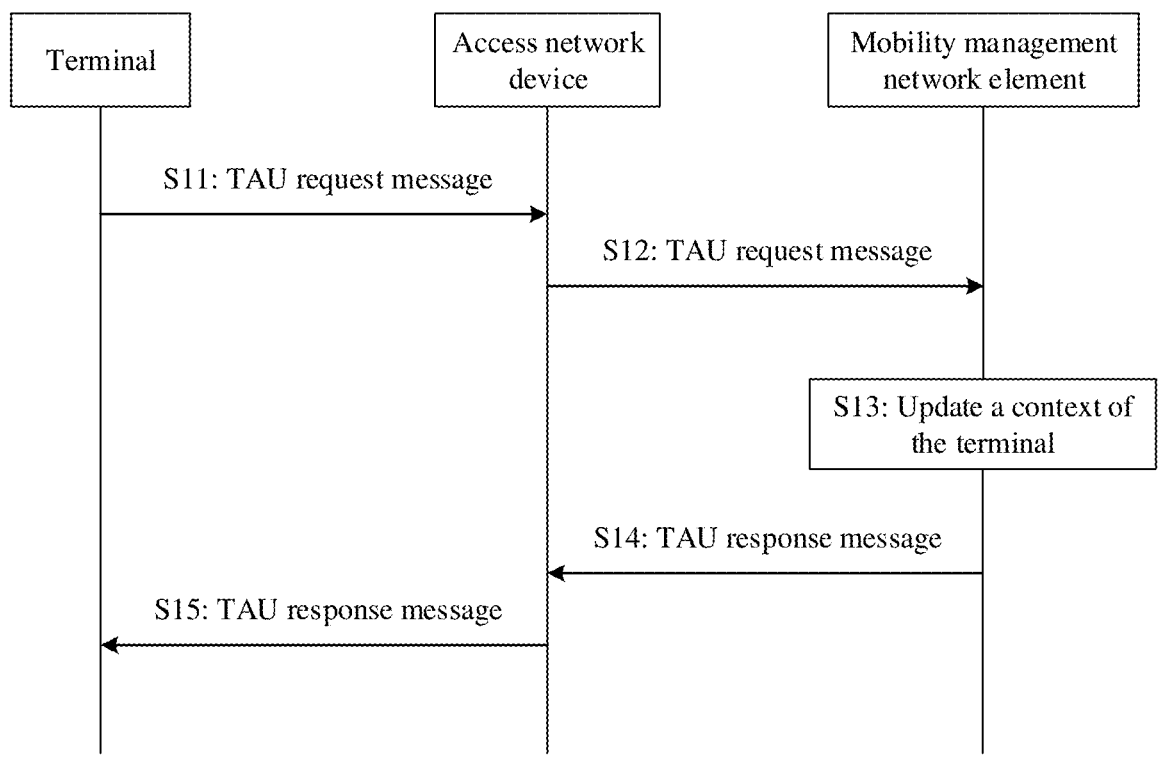
FIG. 4 is a schematic diagram of a TAU procedure in a conventional technology.

For example, as shown in FIG. 4, a TAU procedure in a conventional technology includes the following steps.

S11: A terminal sends a TAU request message to an access network device.

S12: The access network device sends the TAU request message to a mobility management network element.

S13: The mobility management network element updates a context of the terminal.

S14: The mobility management network element sends a TAU response message to the access network device.

S15: The access network device sends the TAU response message to the terminal.

8. First-Type Terminal and Second-Type Terminal

No AS security context is established between the first-type terminal and an access network device. An AS security context is established between the second-type terminal and the access network device.

During actual application, the first-type terminal does not have an AS security protection capability; or the first-type terminal has the AS security protection capability, but the AS security protection capability is not activated. Therefore, the first-type terminal does not establish the AS security context, and accordingly the first-type terminal does not apply AS signaling security protection using the AS security context.

For example, the first-type terminal may be a CP-optimized narrowband Internet of Things (narrowband Internet of Things, NB-IoT) terminal or a CP-optimized cellular Internet of Things (cellular Internet of Things, CIoT) terminal. Embodiments of this application are not limited thereto.

For example, the second-type terminal may be an ordinary mobile phone, or the like. Embodiments of this application are not limited thereto.

The foregoing describes terms used in embodiments of this application, and details are not described below again.

The technical solutions provided in embodiments of this application may be applied to various communication systems, for example, a 4G communication system, a 5G communication system, a future evolved system, or a system converging a plurality of communication systems. The technical solutions provided in this application may be applied to a plurality of application scenarios, for example, machine to machine (machine to machine, M2M), macro-micro communication, enhanced mobile broadband (enhanced mobile broadband, eMBB), ultra-reliable low-latency communication (ultra reliable & low latency communication, URLLC), and massive machine-type communications (massive machine-type communications, mMTC). These communication scenarios may include but are not limited to communication between communication devices, communication between network devices, communication between a network device and a communication device, and the like. The following provides descriptions by using an example in which the technical solutions are applied to a scenario of communication between a network device and a terminal.

In addition, network architectures and service scenarios described in embodiments of this application are intended to describe the technical solutions in embodiments of this application more clearly, and do not constitute any limitation on the technical solutions provided in embodiments of this application. A person of ordinary skill in the art may learn that with evolution of the network architectures and emergence of new service scenarios, the technical solutions provided in embodiments of this application are also applicable to similar technical problems.

Figure 5A:
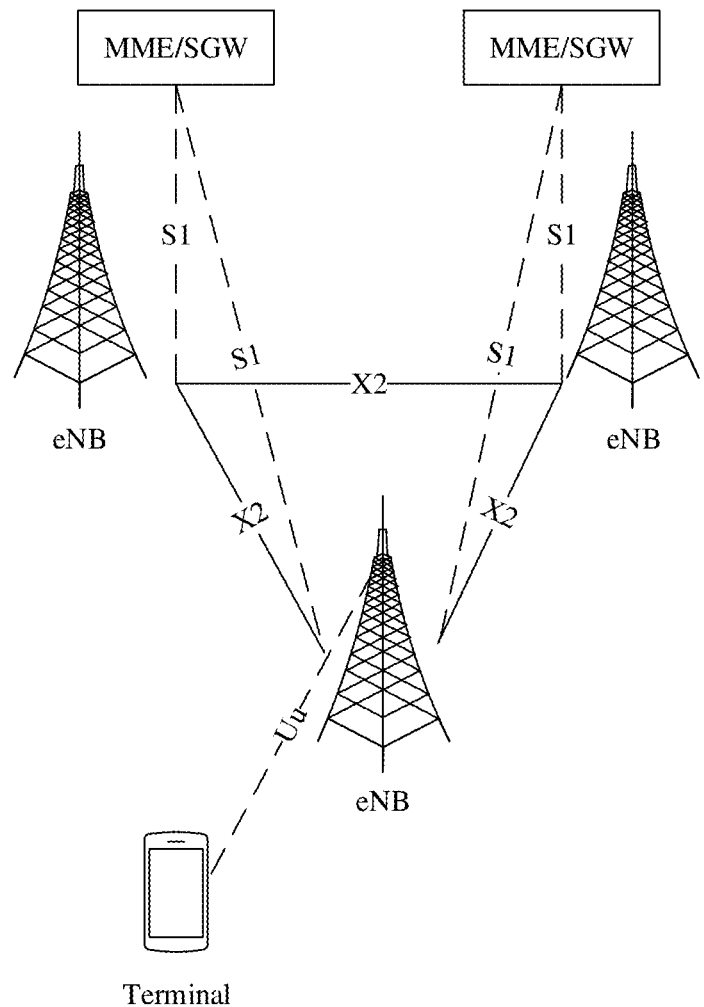
FIG. 5(*a*) is a schematic diagram of a structure of an LTE network according to an embodiment of this application.

FIG. 5(a) shows an architecture of an LTE network to which the technical solutions provided in embodiments of this application are applicable. The LTE network includes one or more terminals, an evolved universal mobile telecommunications system (universal mobile telecommunications system, UMTS) terrestrial radio access network (evolved UMTS terrestrial radio access network, E-UTRAN), and an evolved packet core (evolved packet core, EPC).

The E-UTRAN includes one or more evolved NodeBs (Evolved NodeBs, eNBs, or eNodeBs). The eNB is responsible for radio resource management, user data flow encryption, scheduling and sending call information initiated by an MME, routing user plane data to an S-GW, and the like.

The EPC includes the MME and the SGW. The EPC may further include another functional network element not shown in FIG. 5(a). Embodiments of this application are not limited thereto.

The MME is used to send a paging message to a related eNB, for NAS signaling encryption and integrity protection, and the like.

The SGW is a termination of a user plane data packet in a radio access network, and supports an exchange of mobile user plane data of the terminal.

In the LTE network, an interface between the terminal and the eNB may be referred to as a Uu interface, an interface between two eNBs may be referred to as an X2 interface, and an interface between the eNB and the EPC may be referred to as an S1 interface. It may be understood that the names of the Uu interface, the X2 interface, and the S1 interface are merely examples, and embodiments of this application are not limited thereto.

Figure 5B:
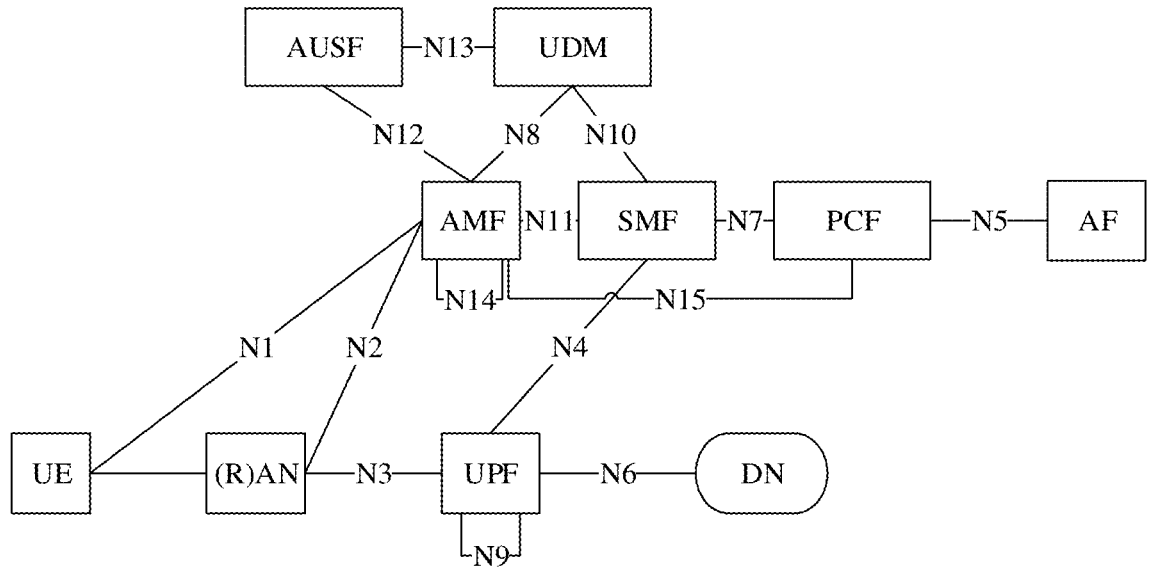

FIG. 5(b) shows an architecture of a 5G network to which the technical solutions provided in embodiments of this application are applicable. The 5G network may include a terminal, a radio access network (radio access network, RAN) or an access network (access network, AN) (which are collectively referred to as a (R)AN below), a core network (core network, CN), and a data network (data network, DN).

The terminal may be a device having a wireless transceiver function. The terminal may have different names, for example, user equipment (user equipment, UE), an access terminal, a terminal unit, a terminal station, a mobile station, a mobile console, a remote station, a remote terminal, a mobile device, a wireless communication device, a terminal agent, or a terminal apparatus. The terminal may be deployed on land and includes an indoor or outdoor device, a handheld device, or a vehicle-mounted device; or may be deployed on a water surface (for example, on a ship); or may be deployed in the air (for example, on an airplane, a balloon, or a satellite). The terminal includes a handheld device, a vehicle-mounted device, a wearable device, or a computing device having a wireless communication function. For example, the terminal may be a mobile phone (mobile phone), a tablet computer, or a computer having a wireless transceiver function. Alternatively, the terminal device may be a virtual reality (virtual reality, VR) terminal device, an augmented reality (augmented reality, AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. In embodiments of this application, an apparatus for implementing a function of the terminal may be a terminal, or may be an apparatus that can support the terminal in implementing the function, for example, a chip system. In embodiments of this application, the chip system may include a chip, or may include a chip and another discrete component. In embodiments of this application, an example in which the apparatus for implementing the function of the terminal is the terminal is used to describe the technical solutions provided in embodiments of this application.

An access network device may also be referred to as a base station. There may be various forms of base stations, for example, a macro base station, a micro base station (also referred to as a small cell), a relay station, and an access point. Specifically, the base station may be an access point (access point, AP) in a wireless local area network (wireless local area network, WLAN), a base transceiver station (Base Transceiver Station, BTS) in a global system for mobile communications (Global System for Mobile Communications, GSM) or code division multiple access (Code Division Multiple Access, CDMA), a NodeB (NodeB, NB) in wideband code division multiple access (Wideband Code Division Multiple Access, WCDMA), an eNB, a relay station, an access point, a vehicle-mounted device, or a wearable device in LTE, a next generation NodeB (the next generation NodeB, gNB) in a future 5G network, a base station in a future evolved public land mobile network (public land mobile network, PLMN), or the like.

The base station usually includes a baseband unit (baseband unit, BBU), a remote radio unit (remote radio unit, RRU), an antenna, and a feeder used to connect the RRU and the antenna. The BBU is configured to be responsible for signal modulation. The RRU is configured to be responsible for radio frequency processing. The antenna is configured to be responsible for conversion between a pilot wave on a cable and a space wave in the air. A distributed base station greatly shortens a length of the feeder between the RRU and the antenna, so that both signal losses and costs of the feeder can be reduced. In addition, the RRU and the antenna are relatively small and can be installed anywhere, making network planning more flexible. The RRU may be remotely placed. In addition, all BBUs may be centralized and placed in a central office (central office, CO). In this centralized manner, a quantity of base station equipment rooms can be greatly reduced, energy consumption of auxiliary devices, especially air conditioners, can be reduced, and carbon emissions can be greatly reduced. In addition, after distributed BBUs are centralized into a BBU baseband pool, the BBUs can be managed and scheduled centrally, and resources can be allocated more flexibly. In this mode, all physical base stations evolve into virtual base stations. All the virtual base stations share information such as data sent and received by users and channel quality in the BBU baseband pool, and cooperate with each other, to implement joint scheduling.

In some deployments, the base station may include a centralized unit (centralized unit, CU) and a distributed unit (distributed unit, DU). The base station may further include an active antenna unit (active antenna unit, AAU). The CU implements some functions of the base station, and the DU implements some functions of the base station. For example, the CU is responsible for processing a non-real-time protocol and service, and implementing functions of a radio resource control (radio resource control, RRC) layer and a packet data convergence protocol (packet data convergence protocol, PDCP) layer. The DU is responsible for processing a physical layer protocol and a real-time service, and implementing functions of a radio link control (radio link control, RLC for short) layer, a media access control (media access control, MAC) layer, and a physical (physical, PHY) layer. The AAU implements some physical layer processing functions, radio frequency processing, and a function related to an active antenna. Information at the RRC layer eventually becomes information at the PHY layer, or is converted from information at the PHY layer. Therefore, in this architecture, higher layer signaling, for example, RRC layer signaling or PDCP layer signaling, may also be considered as being sent by the DU or sent by the DU and the AAU. It may be understood that, in embodiments of this application, the access network device may be a device including one or more of a CU node, a DU node, and an AAU node. In addition, the CU may be classified as a network device in a RAN, or the CU may be classified as a network device in a core network (core network, CN). This is not limited herein.

In a possible design, for the base station, a control plane (control plane, CP) and a user plane (user plane, UP) of the CU may be further separated and implemented by using different entities. In other words, the CU may be divided into a CU-CP and a CU-UP.

The core network includes a plurality of core network elements (or referred to as network function network elements), for example, an access and mobility management function (access and mobility management function, AMF) network element, a session management function (session management function, SMF) network element, a policy control function (policy control function, PCF) network element, a user plane function (user plane function, UPF) network element, an application function (application function) network element, an authentication server function (authentication server function, AUSF) network element, and a unified data management (unified data management, UDM) network element.

In addition, the core network may further include some network elements not shown in FIG. 5(b), for example, a security anchor function (security anchor function, SEAF) network element and an authentication credential repository and processing function (authentication credential repository and processing function, ARPF). Details are not described herein in embodiments of this application.

The AMF network element is mainly responsible for mobility management processing, such as access control, mobility management, attachment and detachment, and SMF selection. When providing a service for a session in the terminal, the AMF network element provides control plane storage resources for the session, to store a session identifier, an SMF identifier associated with the session identifier, and the like.

The terminal communicates with the AMF through a next generation (Next generation, N) 1 interface (N1 for short), the RAN device communicates with the AMF through an N2 interface (N2 for short), the RAN device communicates with the UPF through an N3 interface (N3 for short), and the UPF communicates with the DN through an N6 interface (N6 for short).

Control plane network elements, such as the AMF, the SMF, the UDM, the AUSF, or the PCF, can also interact with each other through service-based interfaces. For example, as shown in FIG. 5(b), a service-based interface exhibited by the AMF may be Namf, a service-based interface exhibited by the SMF may be Nsmf, a service-based interface exhibited by the UDM may be Nudm, a service-based interface exhibited by the PCF may be Npcf, and a service-based interface exhibited by the AUSF may be Nausf. Details are not described herein.

Figure 6:
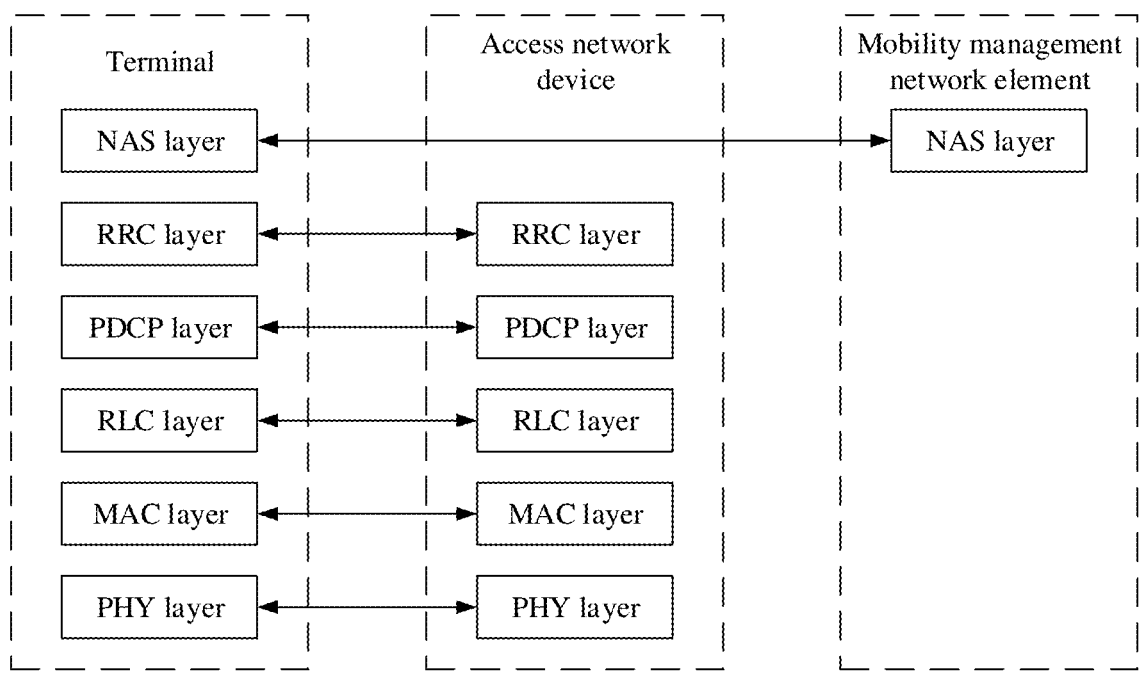
FIG. 6 is a schematic diagram of a protocol stack according to an embodiment of this application.

FIG. 6 is a schematic diagram of a protocol stack according to an embodiment of this application. As shown in FIG. 6, a protocol stack of a terminal includes at least a non-access stratum, an RRC layer, a packet data convergence protocol (packet data convergence protocol, PDCP) layer, a radio link control (radio link control, RLC) layer, a media access control (media access control, MAC) layer, and a physical layer (PHY layer). The RRC layer, the PDCP layer, the RLC layer, the MAC layer, and the PHY layer all belong to an access stratum.

The non-access stratum is a function layer between the terminal and a core network, and is used to support signaling and data transmission between the terminal and a network element (for example, a mobility management network element) of the core network.

The RRC layer is used to support functions such as radio resource management and RRC connection control.

For definitions and functions of other protocol layers such as the PDCP layer and the RLC layer, refer to descriptions in the conventional technology. Details are not described herein.

Figure 7:
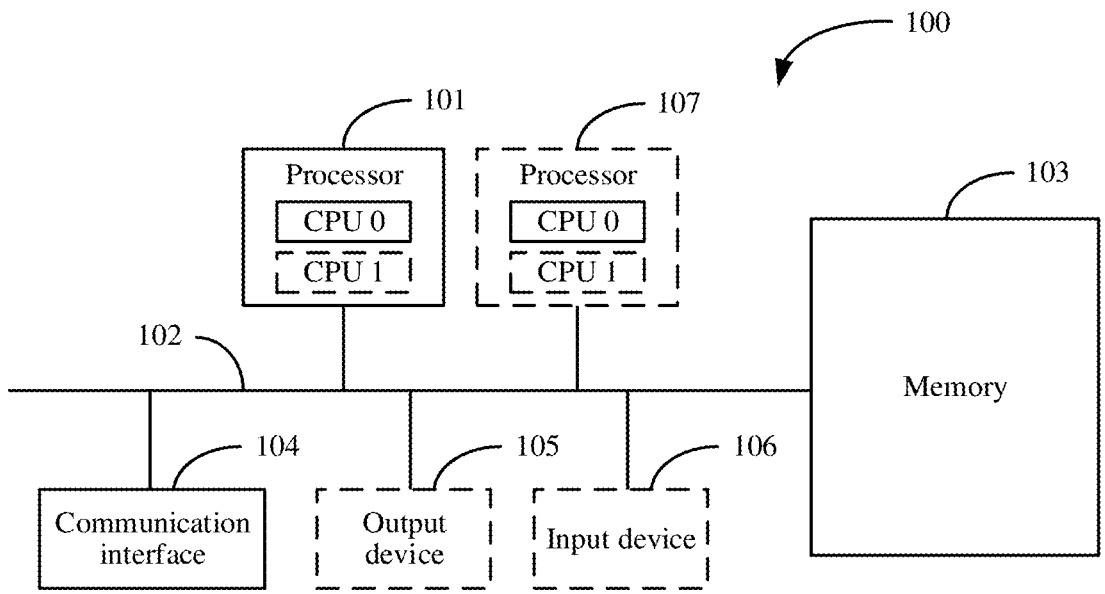
FIG. 7 is a schematic diagram of a structure of a communication apparatus according to an embodiment of this application.

As shown in FIG. 7, the apparatus 100 includes at least one processor 101, a communication line 102, a memory 103, and at least one communication interface 104.

The processor 101 may be a general-purpose central processing unit (central processing unit, CPU), a microprocessor, an application-specific integrated circuit (application-specific integrated circuit, ASIC), or one or more integrated circuits configured to control program execution of the solutions of this application.

The communication line 102 may include a path on which information is transferred between the foregoing components.

The communication interface 104 is configured to communicate, via any apparatus such as a transceiver, with another device or a communication network, such as the Ethernet, a radio access network (radio access network, RAN), or a wireless local area network (wireless local area network, WLAN).

The memory 103 may be a read-only memory (read-only memory, ROM) or another type of static storage device capable of storing static information and instructions, or a random access memory (random access memory, RAM) or another type of dynamic storage device capable of storing information and instructions, or may be an electrically erasable programmable read-only memory (electrically erasable programmable read-only memory, EEPROM), a compact disc read-only memory (compact disc read-only memory, CD-ROM) or other compact disc storage, optical disc storage (including a compressed optical disc, a laser disc, an optical disc, a digital versatile optical disc, a Blu-ray optical disc, or the like), a magnetic disk storage medium or another magnetic storage device, or any other medium capable of carrying or storing program code in a form of instructions or data structures and capable of being accessed by a computer, but is not limited thereto. The memory may exist independently, and is connected to the processor through the communication line 102. Alternatively, the memory may be integrated with the processor.

The memory 103 is configured to store computer-executable instructions for executing the solutions of this application, and the processor 101 controls the execution. The processor 101 is configured to execute the computer-executable instruction stored in the memory 103, to implement the technical solutions provided in embodiments of this application.

Optionally, the computer-executable instructions in embodiments of this application may also be referred to as application program code. This is not specifically limited in embodiments of this application.

During specific implementation, in an embodiment, the processor 101 may include one or more CPUs, for example, a CPU 0 and a CPU 1 in FIG. 7.

During specific implementation, in an embodiment, the apparatus 100 may include a plurality of processors, for example, the processor 101 and a processor 107 in FIG. 7. Each of the processors may be a single-core (single-CPU) processor or a multi-core (multi-CPU) processor. The processor herein may refer to one or more devices, circuits, and/or processing cores configured to process data (for example, computer program instructions).

During specific implementation, in an embodiment, the apparatus 100 may further include an output device 105 and an input device 106. The output device 105 communicates with the processor 101, and may display information in a plurality of manners. For example, the output device 105 may be a liquid crystal display (liquid crystal display, LCD), a light-emitting diode (light-emitting diode, LED) display device, a cathode ray tube (cathode ray tube, CRT) display device, or a projector (projector). The input device 106 communicates with the processor 101, and may receive an input from a user in a plurality of manners. For example, the input device 106 may be a mouse, a keyboard, a touchscreen device, or a sensor device.

Figure 8:
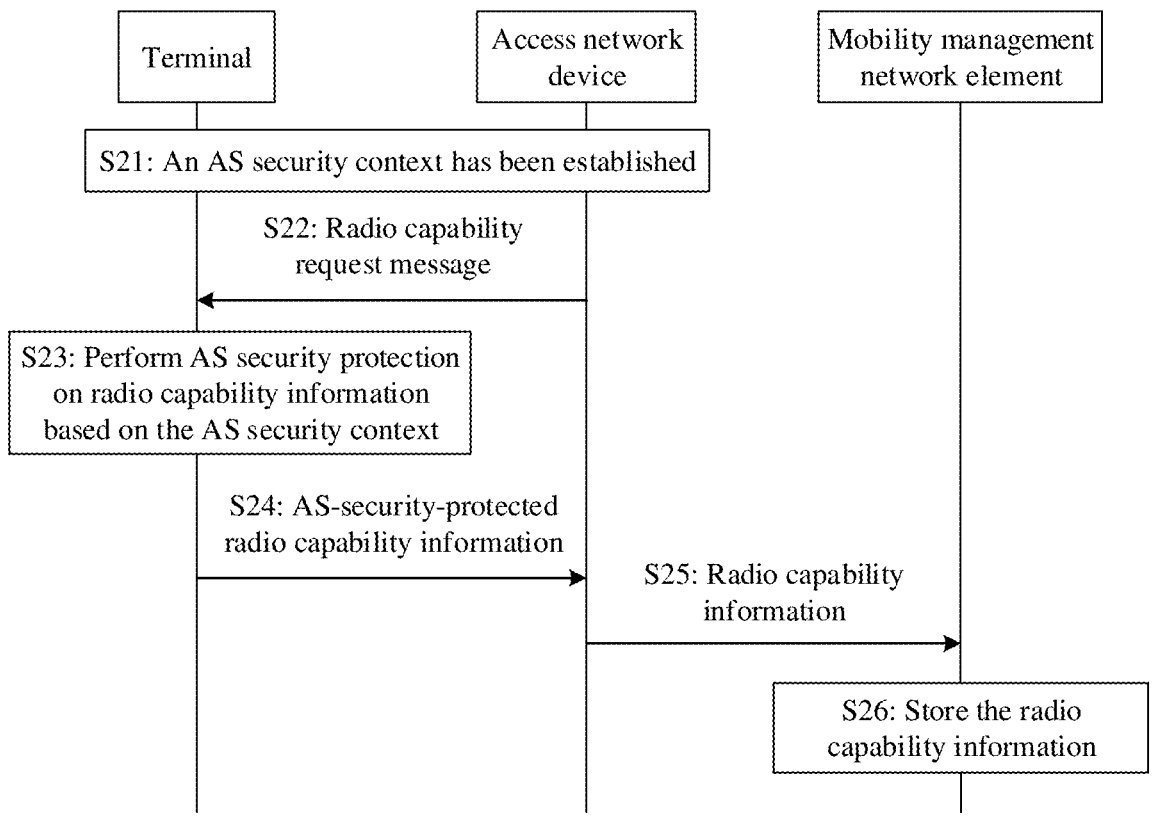
FIG. 8 is a schematic diagram of a transmission procedure of radio capability information in the conventional technology.

For example, in the conventional technology, for a transmission procedure of radio capability information, refer to FIG. 8. As shown in FIG. 8, the transmission procedure of the radio capability information includes the following steps.

S21: An AS security context is established between a terminal and an access network device.

S22: The access network device sends a radio capability request message to the terminal, where the radio capability request message is used to request radio capability information of the terminal.

S23: The terminal performs AS security protection on the radio capability information based on the AS security context.

S24: The terminal sends, to the access network device, the AS-security-protected radio capability information.

It may be understood that the access network device performs security deprotection on the AS-security-protected radio capability information after receiving the AS-security-protected radio capability information. In this way, the access network device may use the radio capability information.

S25: The access network device sends the radio capability information to a mobility management network element.

S26: The mobility management network element stores the radio capability information of the terminal.

It can be learned from the example shown in FIG. 8 that, in the conventional technology, private data of the terminal is AS security protected to ensure its security in a transmission process. However, in some scenarios, for example, the terminal does not have an AS security protection capability, or the access network device does not have an AS security protection parameter in a TAU procedure, the AS security context consequently cannot be established between the terminal and the access network device. In this case, the private data of the terminal is not AS security protected in a process in which a network side learns of the private data of the terminal. As a result, the private data of the terminal is prone to be tampered with by attackers, affecting security of a communication network.

Figure 9:
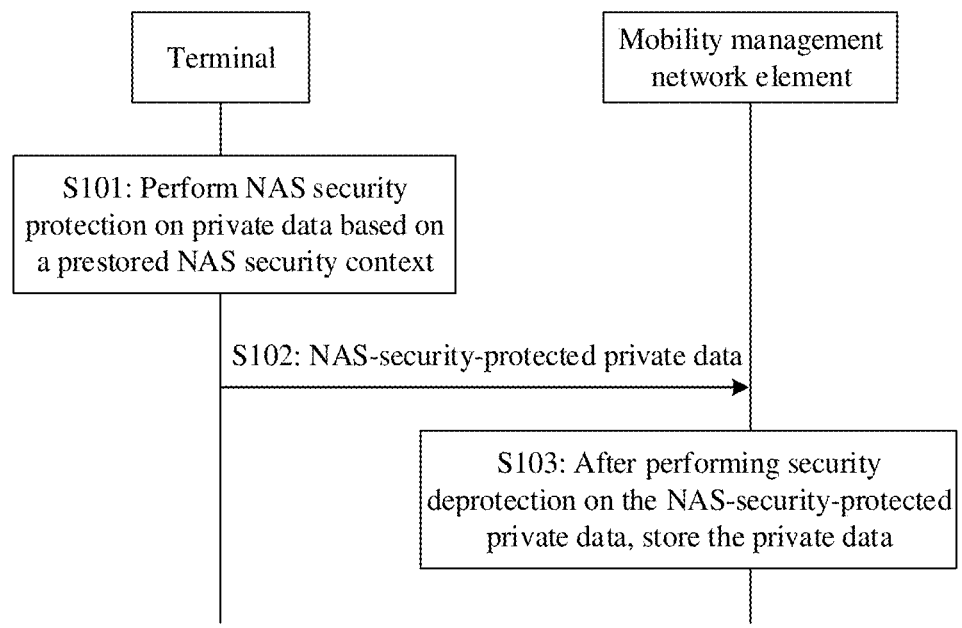
FIG. 9 is a flowchart of a data transmission method according to an embodiment of this application.

To resolve this technical problem, an embodiment of this application provides a data transmission method. As shown in FIG. 9, the method includes the following steps.

S101: A terminal performs NAS security protection on private data of the terminal based on a prestored NAS security context.

For example, the private data of the terminal may be radio capability information, and the radio capability information may be a radio capability parameter and/or a radio capability identifier.

Optionally, the NAS security protection is integrity protection. Alternatively, the NAS security protection is integrity protection and encryption protection.

For example, that the terminal performs integrity protection on the private data may be specifically implemented as follows: The terminal calculates first NAS MAC based on the private data, a NAS integrity protection parameter, and a NAS integrity protection algorithm.

In this embodiment of this application, the first NAS MAC may be classified as first uplink NAS MAC and first downlink NAS MAC. The first uplink NAS MAC is a part of bits of the first NAS MAC, and the first downlink NAS MAC is the other part of bits of the first NAS MAC. For example, the first NAS MAC may include 32 bits, the first uplink NAS MAC is the first 16 bits of the first NAS MAC, and the first downlink NAS MAC is the last 16 bits of the first NAS MAC.

The NAS integrity protection parameter includes an uplink NAS count and a NAS integrity protection key (Knas-int). Optionally, the NAS integrity protection parameter further includes a target cell ID.

For example, with reference to FIG. 2, the terminal may set the key to the NAS integrity protection key, set the count to the uplink NAS count, set the message to the target cell ID and the private data, set the direction to a bit value corresponding to an uplink direction, and set the bearer to a preset constant. Then, the terminal inputs the parameters into the EIA, to determine the first NAS MAC.

The uplink NAS count is a NAS count corresponding to a next NAS message sent by the terminal.

The target cell ID is used to indicate a target cell connected to the terminal. For example, the target cell ID may be a physical identifier (physical cell identifier, PCI) or a cell global identifier (cell global identification, CGI) of the target cell. This application is not limited thereto. It should be noted that the target cell ID is used for calculation of the NAS MAC, where an objective is to bind the NAS MAC to the target cell, to prevent a message carrying the NAS MAC from being replayed to another cell.

The direction is used to indicate a data transmission direction, and may be indicated by using one or more bits. For example, assuming that the direction is indicated by using one bit, when the direction is set to 0, it indicates an uplink direction; and when the direction is set to 1, it indicates a downlink direction.

When the bearer is set to 0, it indicates that the terminal accesses a network using a 3GPP access technology. When the bearer is set to 1, it indicates that the terminal accesses a network using a non-3GPP access technology. In this embodiment of this application, the bearer may be set to 0.

For example, that the terminal performs encryption protection on the private data may be specifically implemented as follows: The terminal generates a keystream based on a NAS encryption parameter and a NAS encryption algorithm. Then, the terminal generates the encrypted private data based on the keystream and the private data. The NAS encryption parameter includes a NAS encryption key (Knasenc). Optionally, the NAS encryption parameter further includes an uplink NAS count.

Using an example for description with reference to FIG. 1, the terminal may set the key to the NAS encryption key, set the count to the uplink NAS count, set the direction to a bit value corresponding to an uplink direction, set the bearer to a preset constant, and set the length to a length of the keystream, to generate the keystream. Then, the terminal generates a ciphertext (namely, the encrypted private data) based on a plaintext (namely, the unencrypted private data) and the keystream.

In an implementation, an RRC layer of the terminal sends the private data to a NAS layer of the terminal, and the NAS layer of the terminal then performs NAS security protection on the private data based on the prestored NAS security context.

S102: The terminal sends the NAS-security-protected private data to a mobility management network element, and the mobility management network element receives the NAS-security-protected private data from the terminal.

In a 4G network, the mobility management network element may be a mobility management entity (mobility management entity, MME). In a 5G network, the mobility management network element may be an AMF. In a further evolved system, the mobility management network element may be a NAS security termination similar to the MME/AMF. A unified description is provided herein, and is not repeated below.

For example, when the private data is only integrity protected, the NAS-security-protected private data includes unencrypted private data and first uplink NAS MAC. When the private data is both integrity protected and encryption protected, the NAS-security-protected private data includes encrypted private data and first uplink NAS MAC.

S103: After performing security deprotection on the NAS-security-protected private data, the mobility management network element stores the private data.

It may be understood that, when the private data is integrity protected, the security deprotection operation includes integrity check. When the private data is integrity protected, the security deprotection operation includes decryption.

For example, that the mobility management network element performs integrity check on the NAS-security-protected private data may be specifically implemented as follows: The mobility management network element generates second NAS MAC based on the NAS integrity protection key, the NAS integrity protection parameter, the private data, and an integrity protection algorithm. Then, the mobility management network element determines the second uplink NAS MAC based on the second NAS MAC. The mobility management network element compares whether the first uplink NAS MAC is the same as the second uplink NAS MAC. If the first uplink NAS MAC is the same as the second uplink NAS MAC, the mobility management network element determines that the private data reported by the terminal is complete. Otherwise, the mobility management network element determines that the private data reported by the terminal is incomplete.

In this embodiment of this application, the second NAS MAC may be classified as the second uplink NAS MAC and second downlink NAS MAC. The second uplink NAS MAC is a part of bits of the second NAS MAC, and the second downlink NAS MAC is the other part of bits of the second NAS MAC. For example, the second NAS MAC may include 32 bits, the second uplink NAS MAC is the first 16 bits of the second NAS MAC, and the second downlink NAS MAC is the last 16 bits of the second NAS MAC.

For example, that the mobility management network element performs a decryption operation on the NAS-security-protected private data may be specifically implemented as follows: The mobility management network element generates a keystream based on a NAS encryption parameter and a NAS encryption algorithm. Then, the mobility management network element obtains plaintext (namely, the decrypted private data) based on the keystream and the ciphertext.

Optionally, after successfully performing security deprotection on the private data, the mobility management network element may further generate corresponding identifier information for the private data, where the private data is used to uniquely identify the private data. For example, the private data is a radio capability parameter. The mobility management network element may generate a radio capability identifier corresponding to the radio capability parameter. In this way, the mobility management network element establishes and stores a correspondence between the private data and the identifier information.

After generating the identifier information corresponding to the private data, the mobility management network element sends the identifier information to the terminal. Therefore, when the terminal reports the private data to the network side next time, the terminal may send the identifier information of the private data instead of sending the private data. Another network element (for example, an access network device) may obtain the private data from the mobility management network element based on the identifier information.

It should be noted that if the mobility management network element cannot successfully perform security deprotection on the NAS-security-protected private data, that is, the mobility management network element determines that the NAS-security-protected private data is not successfully integrity checked, or the mobility management network element does not successfully decrypt the NAS-security-protected private data, the mobility management network element discards the NAS-security-protected private data. Optionally, the mobility management network element may further notify the terminal to resend the NAS-security-protected private data.

Based on the technical solution shown in FIG. 9, in a case in which no AS security context is established between the terminal and the access network device, the terminal sends the NAS-security-protected private data to the mobility management network element, to ensure security of the private data in a transmission process.

The following specifically describes the technical solution shown in FIG. 9 with reference to different implementations of step S102.

Figure 10:
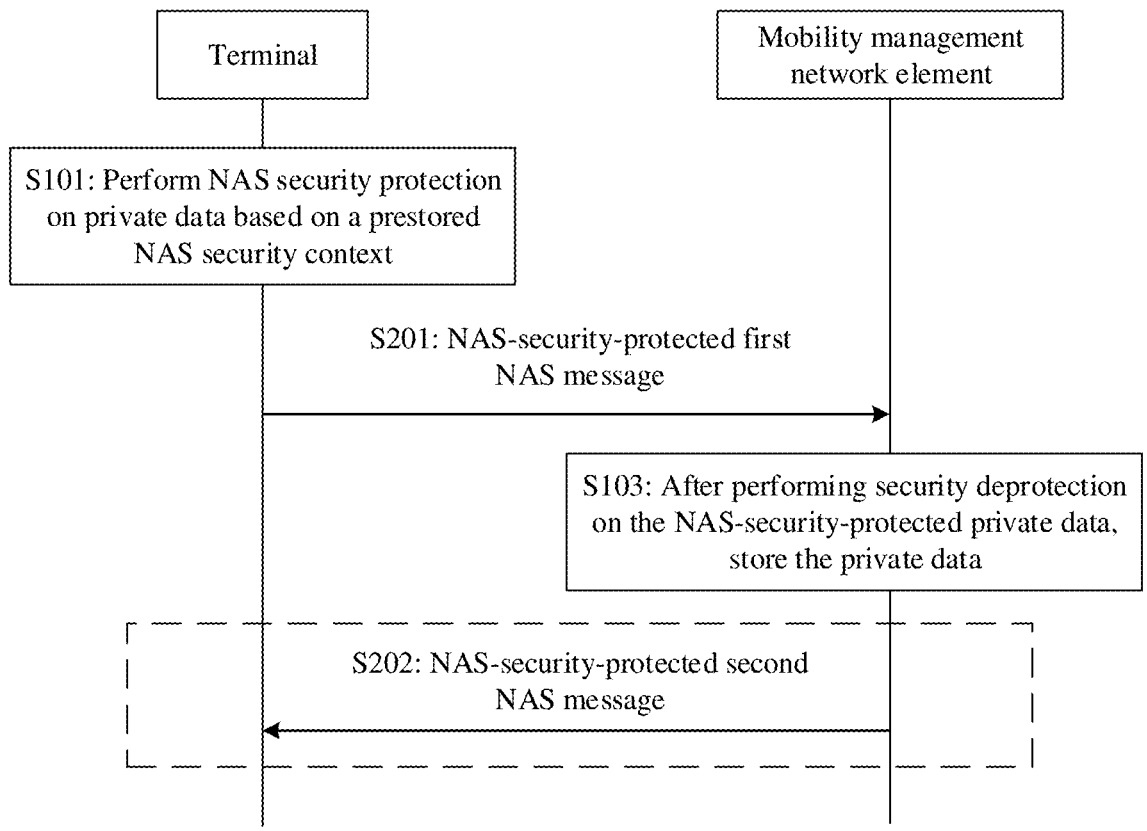
FIG. 10 is another flowchart of another data transmission method according to an embodiment of this application.

(1) As shown in FIG. 10, step S102 may be specifically implemented as step S201.

S201: The terminal sends a NAS-security-protected first NAS message to the mobility management network element, and the mobility management network element receives the NAS-security-protected first NAS message. The first NAS message includes the private data.

It may be understood that the private data included in the first NAS message is also NAS security protected because the first NAS message is NAS security protected.

In a possible design, an existing NAS message, for example, an initial NAS message or a NAS SMP message, may be reused as the first NAS message. The existing NAS message may include a protected information element used to carry the private data. The existing NAS message may further include indication information, and the indication information is used to indicate that the existing NAS message carries the NAS-security-protected private data.

Optionally, when the first NAS message is the initial NAS message, the private data may be protected using an initial NAS security mechanism. For example, non-plaintext information of the initial NAS message includes the private data.

In another possible design, the first NAS message may alternatively be a new NAS message used to carry the private data.

It may be understood that the first NAS message may be transmitted as a complete NAS message, or may be transmitted as a plurality of NAS messages. This is not limited in this embodiment of this application.

In a possible implementation, after performing NAS security protection on the private data, the NAS layer of the terminal sends the first NAS message to the mobility management network element.

Optionally, as shown in FIG. 10, after step S201, the data transmission method may further include step S202.

S202: The mobility management network element sends a second NAS message to the terminal, and the terminal receives the second NAS message from the mobility management network element. The second NAS message is used to indicate that the mobility management network element successfully receives the first NAS message.

Figure 11:
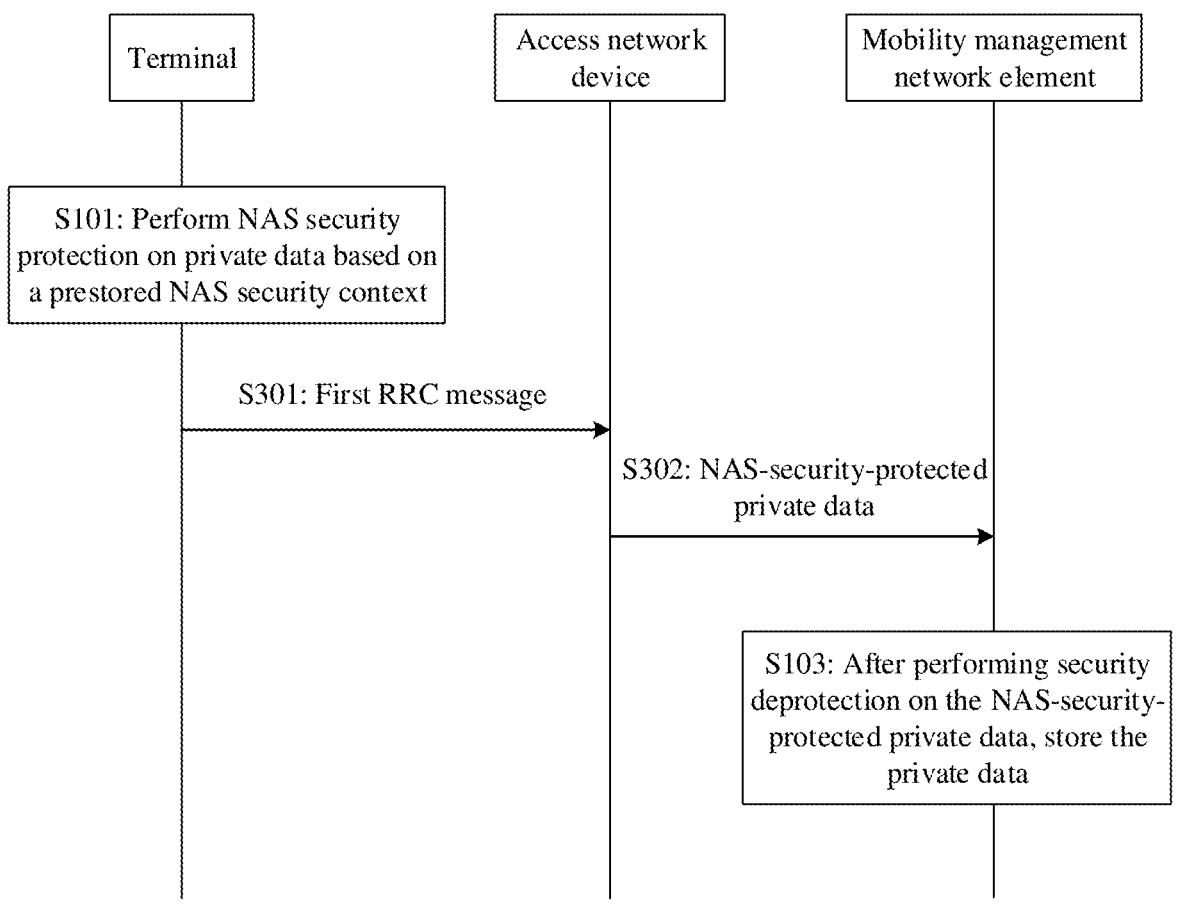
FIG. 11 is another flowchart of another data transmission method according to an embodiment of this application.

(2) As shown in FIG. 11, step S102 may be specifically implemented as steps S301 and S302.

S301: The terminal sends a first RRC message to an access network device, and the access network device receives the first RRC message from the terminal. The first RRC message includes the NAS-security-protected private data.

Optionally, that the first RRC message includes the NAS-security-protected private data includes one of the following cases:

Case 1: The first RRC message includes first uplink NAS MAC and encrypted private data.

Case 2: The first RRC message includes first uplink NAS MAC and unencrypted private data.

Case 3: The first RRC message includes a first NAS container, where the first NAS container includes first uplink NAS MAC and encrypted private data.

Case 4: The first RRC message includes unencrypted private data and a second NAS container, where the second NAS container includes first uplink NAS MAC.

Optionally, the first RRC message may further include a part of bits of an uplink NAS count, for example, five lowest bits of the uplink NAS count.

In a possible implementation, after performing NAS security protection on the private data, a NAS layer of the terminal sends, to an RRC layer of the terminal, the NAS-security-protected private data. Then, the RRC layer of the terminal encapsulates the NAS-security-protected private data into the first RRC message, and sends the first RRC message to the access network device.

S302: The access network device sends the NAS-security-protected private data to a mobility management network element, and the mobility management network element receives the NAS-security-protected private data.

Optionally, when the mobility management network element is an AMF, the NAS-security-protected private data is carried in an N2 message. When the mobility management network element is an MME, the NAS-security-protected private data is carried in an S1 message.

It may be understood that if the first RRC message includes the first uplink NAS MAC and the encrypted private data, the access network device sends the first uplink NAS MAC and the encrypted private data to the mobility management network element. If the first RRC message includes the first uplink NAS MAC and the unencrypted private data, the access network device sends the first uplink NAS MAC and the unencrypted private data to the mobility management network element. If the first RRC message includes the first NAS container, the access network device sends the first NAS container to the mobility management network element. If the first RRC message includes the unencrypted private data and the second NAS container, the access network device sends the unencrypted private data and the second NAS container to the mobility management network element.

It should be noted that when the first RRC message includes the first NAS container or the second NAS container, the access network device does not parse the first NAS container or the second NAS container, but directly uploads the first NAS container or the second NAS container to the mobility management network element, to reduce duration of processing the content included in the first RRC message by the access network device.

Optionally, in addition to the NAS-security-protected private data, the access network device may further send target cell information to the mobility management network element.

The following describes a specific implementation process of transmitting private data between a first-type terminal and a network side with reference to a specific application scenario.

Figure 12:
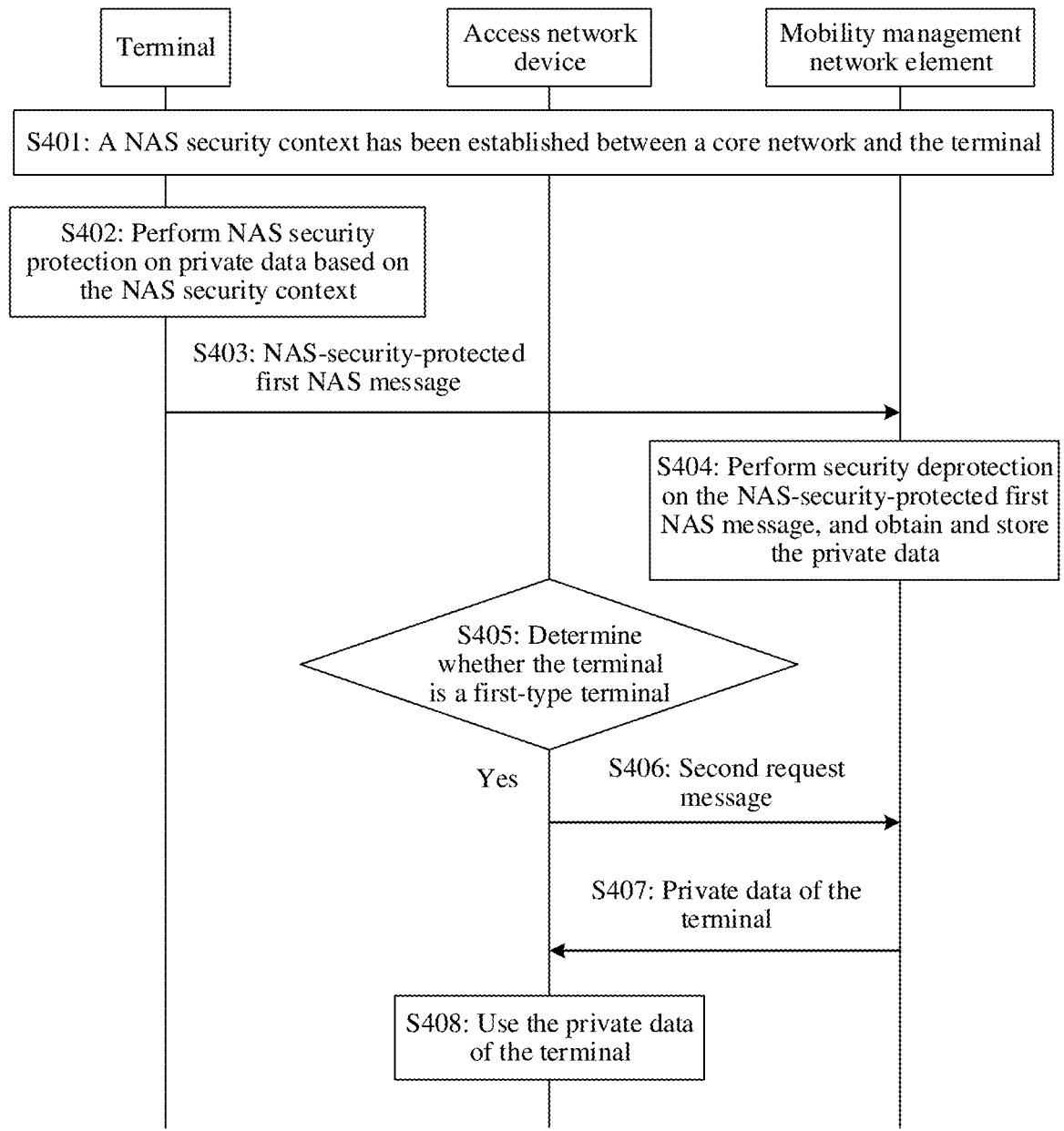
FIG. 12 is another flowchart of another data transmission method according to an embodiment of this application.

FIG. 12 shows a data transmission method according to an embodiment of this application. The method includes the following steps.

S401: A NAS security context has been established between a terminal and a core network.

S402: The terminal performs NAS security protection on private data based on the NAS security context.

S403: The terminal sends a NAS-security-protected first NAS message to a mobility management network element, and the mobility management network element receives the NAS-security-protected first NAS message.

Optionally, in a registration procedure, a cell handover procedure, or another procedure, if the terminal determines that the terminal is the first-type terminal, the terminal may actively perform steps S402 and S403 after the NAS security context is established between the terminal and the core network, to ensure that the network side may obtain the NAS-security-protected private data, so that the network side can normally use the private data.

S404: The mobility management network element performs security deprotection on the NAS-security-protected first NAS message, and obtains and stores the private data of the terminal.

When an access network device needs to obtain the private data of the terminal, the access network device may perform the following step S405.

The following specifically describes a trigger condition for performing step S405 by the access network device.

Trigger condition 1: The access network device receives a specific message delivered by the mobility management network element, where the specific message does not carry the private data of the terminal.

For example, the private data of the terminal is radio capability information. The access network device receives an S1 message delivered by an MME, where the S1 message does not carry the radio capability information. The S1 message may be an initial context setup request (INITIAL CONTEXT SETUP REQUEST), a connection establishment indication (CONNECTION ESTABLISHMENT INDICATION), a UE radio capability match request (UE RADIO CAPABILITY MATCH REQUEST), or the like.

Trigger condition 2: The access network device prepares to perform configuration in which the private data of the terminal needs to be used.

For example, the access network device prepares to perform a procedure in which the access network device is handed over from an E-UTRAN to a UTRAN, or perform dual-link selection.

Trigger condition 3: The access network device receives a trigger message from the mobility management network element, where the trigger message is used to indicate the access network device to obtain the private data of the terminal.

For example, when a second-type terminal performs an attach (attach) procedure, or the second-type terminal performs the first TAU procedure after the second-type terminal attaches the GERAN/UTRAN, or the second-type terminal performs a TAU procedure used to report a radio capability of the terminal, the MME deletes the radio capability information of the terminal, and sends an S1 message to the access network device, to trigger the access network device to obtain the radio capability information of the terminal.

For another example, when the first-type terminal performs an attach (attach) procedure, or the first-type terminal performs the first TAU procedure after the first-type terminal attaches the GERAN/UTRAN network, or the first-type terminal performs a TAU procedure used to report a radio capability of the terminal, the MME delivers a DOWNLINK NAS TRANSPORT message to the access network device, where the DOWNLINK NAS TRANSPORT message carries indication information, to trigger the access network device to obtain the radio capability information of the terminal.

For another example, when the MME requires radio capability information of more terminals based on a single radio voice call continuity (single radio voice call continuity, SRVCC) capability, a terminal use case type, or a local policy, to configure an IP multimedia subsystem (IP multimedia subsystem, IMS) voice over packet switch (packet switch, PS) session supported indication (IMS voice over PS Session Supported Indication), the MME requests the radio capability information of the terminal from the access network device.

S405: The access network device determines whether the terminal is the first-type terminal.

Step S405 may be expressed as follows: The access network device determines whether the terminal has an AS security protection capability.

It may be understood that, if the terminal is the first-type terminal, the terminal does not have the AS security protection capability. If the terminal is not the first-type terminal, the terminal has the AS security protection capability.

Optionally, the access network device may determine whether the terminal is the first-type terminal in any one of the following implementations.

Implementation 1: The access network device determines, based on a type of a cell accessed by the terminal, whether the terminal is the first-type terminal. Specifically, when the terminal accesses a first-type cell, the access network device may determine that the terminal is the first-type terminal. When the terminal does not access the first-type cell, the access network device may determine that the terminal is not the first-type terminal.

The first-type cell is a cell accessed by the first-type terminal, for example, an NB-IoT cell.

Implementation 2: The access network device determines, based on a type of a message sent by the terminal, whether the terminal is the first-type terminal. Specifically, when the terminal sends a first-type message, the access network device may determine that the terminal is the first-type terminal. When the terminal does not send the first-type message, the access network device may determine that the terminal is not the first-type terminal.

The first-type message is a message sent by the first-type terminal. For example, the first-type message may be RRC-SetupRequest-NB or Connection Establishment Indication.

Implementation 3: The access network device determines, based on a network capability information of the terminal, whether the terminal is the first-type terminal. Specifically, when the network capability information of the terminal indicates that the terminal is the first-type terminal, the access network device may determine that the terminal is the first-type terminal. When the network capability information of the terminal does not indicate that the terminal is the first-type terminal, the access network device may determine that the terminal is not the first-type terminal.

Implementation 4: The access network device determines, based on whether second indication information is received, whether the terminal is the first-type terminal. For example, when receiving the second indication information sent by the terminal, the access network device determines that the terminal is the first-type terminal. When not receiving the second indication information, the access network device determines that the terminal is not the first-type terminal.

It may be understood that the foregoing implementations 1 to 4 are merely examples. An implementation in which the access network device determines whether the terminal is the first-type terminal is not specifically limited in this embodiment of this application.

An implementation of step S405 is specifically described below by using an example in which the first terminal is a CP-optimized NB-IoT terminal/CIoT terminal.

Optionally, the access network device may first determine whether the terminal is an Internet of Things terminal, and then determine whether the terminal is a CP-optimized NB-IoT terminal/CIoT terminal. If the terminal is not an Internet of Things terminal, the access network device may determine that the terminal is not a CP-optimized NB-IoT terminal/CIoT terminal.

For example, the access network device may determine, based on a type of a cell accessed by the terminal, whether the terminal is an Internet of Things terminal. Specifically, when the terminal accesses an Internet of Things cell, the access network device may determine that the terminal is an Internet of Things terminal. When the terminal does not access an Internet of Things cell, the access network device may determine that the terminal is not an Internet of Things terminal.

For another example, the access network device determines, based on a type of an RRC message sent by the terminal, whether the terminal is an Internet of Things terminal. Specifically, when the type of the RRC message sent by the terminal is the same as a type of an RRC message of the Internet of Things terminal, the terminal is an Internet of Things terminal. Otherwise, the terminal is not an Internet of Things terminal. For example, when the terminal sends an RRCSetupRequest-NB message, the access network device may determine that the terminal is an Internet of Things terminal.

Optionally, after determining that the current terminal is an Internet of Things terminal, the access network device may further determine whether the terminal is a CP-optimized terminal.

For example, if the access network device receives a specific-type message, the access network device may determine that the terminal is a CP-optimized terminal. The specific-type message may be a Connection Establishment Indication.

For another example, when the network capability information of the terminal indicates that the terminal is a CP-optimized terminal, the access network device may determine that the terminal is a CP-optimized terminal. When the network capability information of the terminal indicates that the terminal is not a CP-optimized terminal, the access network device determines that the terminal is not a CP-optimized terminal.

During actual application, the access network device may first determine whether the terminal is an Internet of Things terminal, and then determine whether the terminal supports CP optimization, to accurately determine whether the terminal is a CP-optimized NB-IoT terminal/CIoT terminal. Alternatively, the access network device may first determine whether the terminal supports CP optimization, and then determine whether the terminal is an Internet of Things terminal, to accurately determine whether the terminal is a CP-optimized NB-IoT terminal/CIoT terminal.

It should be noted that, when the terminal is not the first-type terminal, the access network device obtains the private data of the terminal according to an existing procedure. Details are not described herein.

It should be noted that it is inappropriate for the access network device to directly request the private data from the first-type terminal according to the existing procedure because the terminal is the first-type terminal and the AS security context cannot be established between the access network device and the first-type terminal, to prevent private data which is not AS security protected from being transmitted between the first-type terminal and the access network device. In this way, it is less likely that the private data of the first-type terminal is tampered with by attackers. Based on this, the access network device performs the following step S406, instead of sending a first request message to the terminal.

The first request message is used to request the terminal to send the private data of the terminal to the access network device. Specifically, when the private data is the radio capability information, the first request message may be a radio capability request message.

S406: The access network device sends a second request message to the mobility management network element, and the mobility management network element receives the second request message sent by the access network device.

The second request message is used to request the mobility management network element to send the private data of the terminal to the access network device.

It should be noted that when the mobility management network element is an AMF, the second request message is an N2 message. When the mobility management network element is an MME, the second request message is an S1 message.

In a possible design, the second request message is an N2 message/S1 message dedicated to obtain the private data of the terminal.

In another possible design, an existing N2 message/S1 message is reused as the second request message. In addition, the second request message includes first indication information, where the first indication information is used to indicate the mobility management network element to send the private data of the terminal to the access network device. For example, the second request message may be retrieve UE information (Retrieve UE Information) or a UE capability information indication (UE Capability Info Indication).

Optionally, the second request message includes terminal information or identifier information corresponding to the private data. For example, the terminal information may be an international mobile equipment identity (international mobile station equipment identity, IMEI).

This is not limited in this embodiment of this application.

Optionally, the second request message may further include second indication information. The second indication information is used to indicate that the terminal is the first-type terminal. In other words, the second indication information is used to indicate that the terminal does not have the AS security protection capability.

S407: The mobility management network element sends the private data of the terminal to the access network device, and the access network device receives the private data of the terminal.

It may be understood that the mobility management network element has obtained and stored the private data of the terminal in step S404, and therefore the mobility management network element may find the private data of the terminal based on the second request message, and can directly send the private data of the terminal to the access network device.

Optionally, that the mobility management network element finds the private data of the terminal based on the second request message may be specifically implemented as follows: The mobility management network element finds the private data of the terminal based on the terminal information or the identifier information included in the second request message.

In a possible implementation, the mobility management network element sends a second response message to the access network device, and the access network device receives the second response message from the mobility management network element. The second response message is used to respond to the second request message. The second response message includes the private data of the terminal.

It should be noted that when the mobility management network element is an AMF, the second response message is an N2 message. When the mobility management network element is an MME, the second response message is an S1 message.

Optionally, the second response message may be a new N2 message/S1 message, or an existing N2 message/S1 message may be reused as the second response message.

For example, the second response message may be an initial context setup request (INITIAL CONTEXT SETUP REQUEST), a connection establishment indication (CONNECTION ESTABLISHMENT INDICATION), downlink NAS transport (DOWNLINK NAS TRANSPORT), UE information transfer (UE INFORMATION TRANSFER), or a UE radio capability match request (UE RADIO CAPABILITY MATCH REQUEST). This embodiment of this application is not limited thereto.

S408: The access network device uses the private data of the terminal.

Based on the technical solution shown in FIG. 12, the first-type terminal actively sends the NAS-security-protected private data to the mobility management network element, so that the mobility management network element may send the private data to the access network device when the access network device needs to obtain the private data of the first-type terminal. Therefore, in the process in which the access network device obtains the private data of the first-type terminal, the private data of the first-type terminal without security protection is not transmitted. This prevents the private data of the first-type terminal from being tampered with by attackers, thereby ensuring security of the private data of the first-type terminal in a transmission process.

Figure 13A:
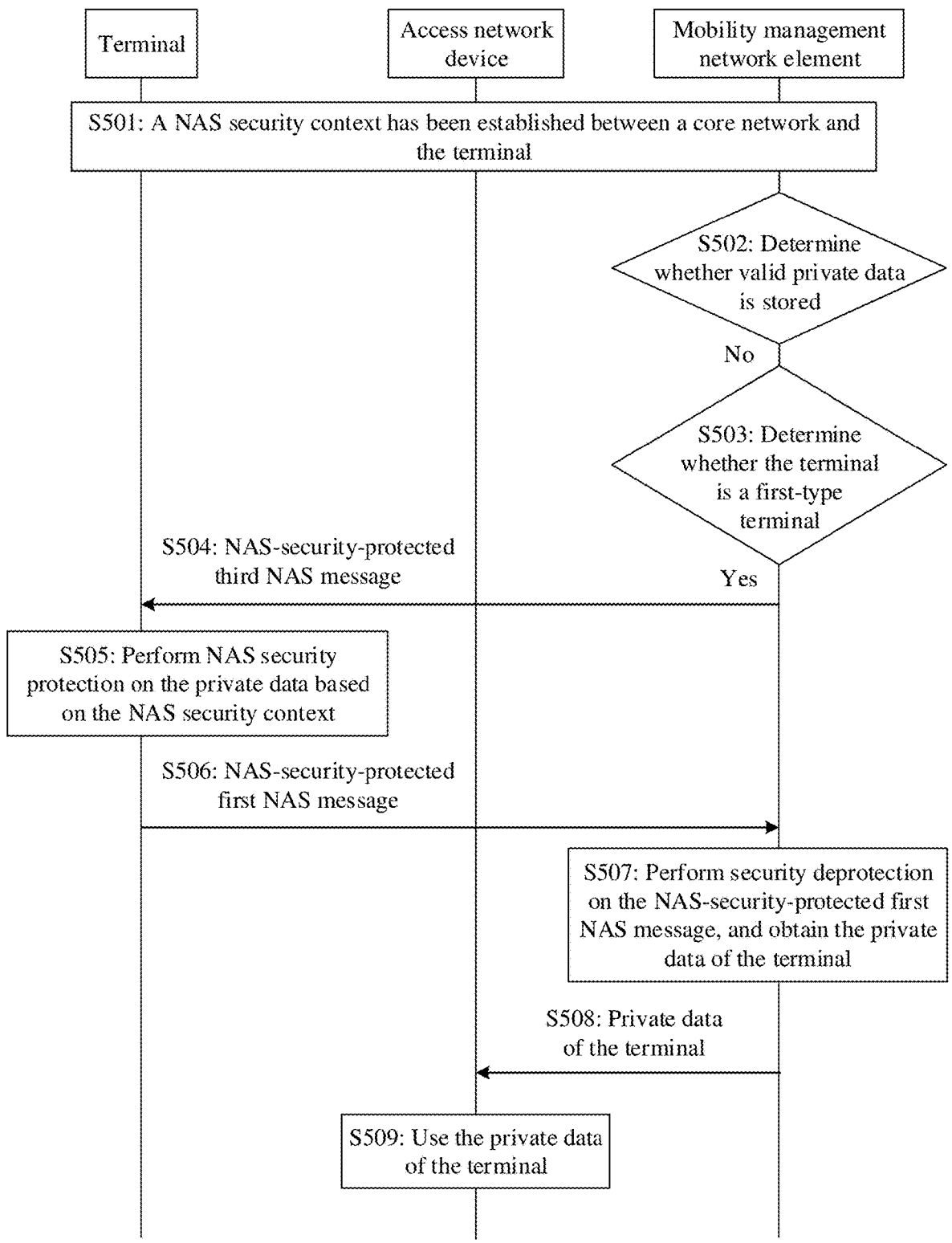
FIG. 13(*a*) is another flowchart of another data transmission method according to an embodiment of this application.

FIG. 13(a) shows a data transmission method according to an embodiment of this application. The method includes the following steps.

S501: A NAS security context is established between a terminal and a core network.

S502: A mobility management network element determines whether valid private data is stored.

The valid private data is private data that is not marked to be deleted.

It may be understood that, in some scenarios, for example, in a procedure in which the terminal reports radio capability information or an attach procedure of the terminal, private data is marked to be deleted although the mobility management network element stores the private data of the terminal. The private data that is marked to be deleted is deleted by the mobility management network element.

In a possible implementation, the mobility management network element searches a database for the private data of the terminal based on the terminal information or the identifier information. When the mobility management network element does not find the private data of the terminal, or the private data of the terminal that is found by the mobility management network element is marked to be deleted, the mobility management network element may determine that no valid private data is stored. When the mobility management network element can find the private data of the terminal, and the private data is not marked to be deleted, the mobility management network element may determine that the valid private data is stored.

When the mobility management network element pre-stores the valid private data, the mobility management network element sends, to an access network device, the private data of the terminal. For a specific implementation process, refer to the related descriptions in step S407, and details are not described herein again.

When the mobility management network element stores no valid private data, the mobility management network element performs the following step S503. Alternatively, the mobility management network element may skip step S503, and directly perform step S504.

S503: The mobility management network element determines whether the terminal is a first-type terminal.

Optionally, the mobility management network element may determine whether the terminal is the first-type terminal in any one of the following implementations.

Implementation 1: The mobility management network element determines, based on network capability information of the terminal, whether the terminal is the first-type terminal. Specifically, when the network capability information of the terminal indicates that the terminal is the first-type terminal, the mobility management network element may determine that the terminal is the first-type terminal. When the network capability information of the terminal does not indicate that the terminal is the first-type terminal, the access network device may determine that the terminal is not the first-type terminal.

For example, the network capability information includes a first information element, which is used to indicate whether the terminal supports CP optimization. The CP optimization herein is specifically CP optimization of a CIoT evolved packet system (evolved packet system, EPS) (control Plane CIoT EPS Optimization). The first information element may be referred to as a "preferred network behavior" information element.

When the first information element is used to indicate that the terminal supports the CP optimization, the mobility management network element may determine that the terminal is the first-type terminal. When the first information element is used to indicate that the terminal does not support the CP optimization, the mobility management network element may determine that the terminal is not the first-type terminal.

Implementation 2: The mobility management network element determines, based on whether second indication information is received, whether the terminal is the first-type terminal. For example, when the mobility management network element receives the second indication information sent by the access network device, the mobility management network element determines that the terminal is the first-type terminal. When the mobility management network element does not receive the second indication information, the mobility management network element determines that the terminal is not the first-type terminal.

It may be understood that the foregoing implementations are merely examples. An implementation in which the mobility management network element determines whether the terminal is the first-type terminal is not specifically limited in this embodiment of this application.

When the terminal is not the first-type terminal, the mobility management network element may send a third request message to the access network device according to a procedure in a conventional technology. The third request message is used to trigger the access network device to obtain the private data from the terminal.

When the terminal is the first-type terminal, the mobility management network element performs the following step S504, instead of sending the third request message to the access network device.

S504: The mobility management network element sends a third NAS message to the terminal, and the terminal receives the third NAS message sent by the mobility management network element. The third NAS message is used to request the terminal to send, to the mobility management network element, the NAS-security-protected private data.

In a possible design, the third NAS message is dedicated to request to obtain the private data of the terminal.

In another possible design, an existing NAS message is reused as the third NAS message. In addition, the third NAS message includes third indication information, where the third indication information is used to indicate the terminal to send, to the mobility management network element, the NAS-security-protected private data.

For the terminal, after receiving the third NAS message, a NAS layer of the terminal requests, from an RRC layer of the terminal, the private data of the terminal, so that the NAS layer of the terminal performs NAS security protection on the private data of the terminal.

S505: The terminal performs NAS security protection on the private data based on the NAS security context.

S506: The terminal sends a NAS-security-protected first NAS message to the mobility management network element, and the mobility management network element receives the NAS-security-protected first NAS message.

S507: The mobility management network element performs security deprotection on the NAS-security-protected first NAS message based on the NAS security context, and obtains the private data of the terminal.

Optionally, after obtaining the private data of the terminal, the mobility management network element stores the private data of the terminal.

S508: The mobility management network element sends the private data of the terminal to the access network device, and the access network device receives the private data of the terminal.

S509: The access network device uses the private data of the terminal.

Based on the technical solution shown in FIG. 13(a), after the security context is established between the first-type terminal and the core network, the mobility management network element sends the third NAS message to the first-type terminal, to trigger the first-type terminal to report the private data. In this way, the network side can learn of the private data of the first-type terminal.

Figure 13B:
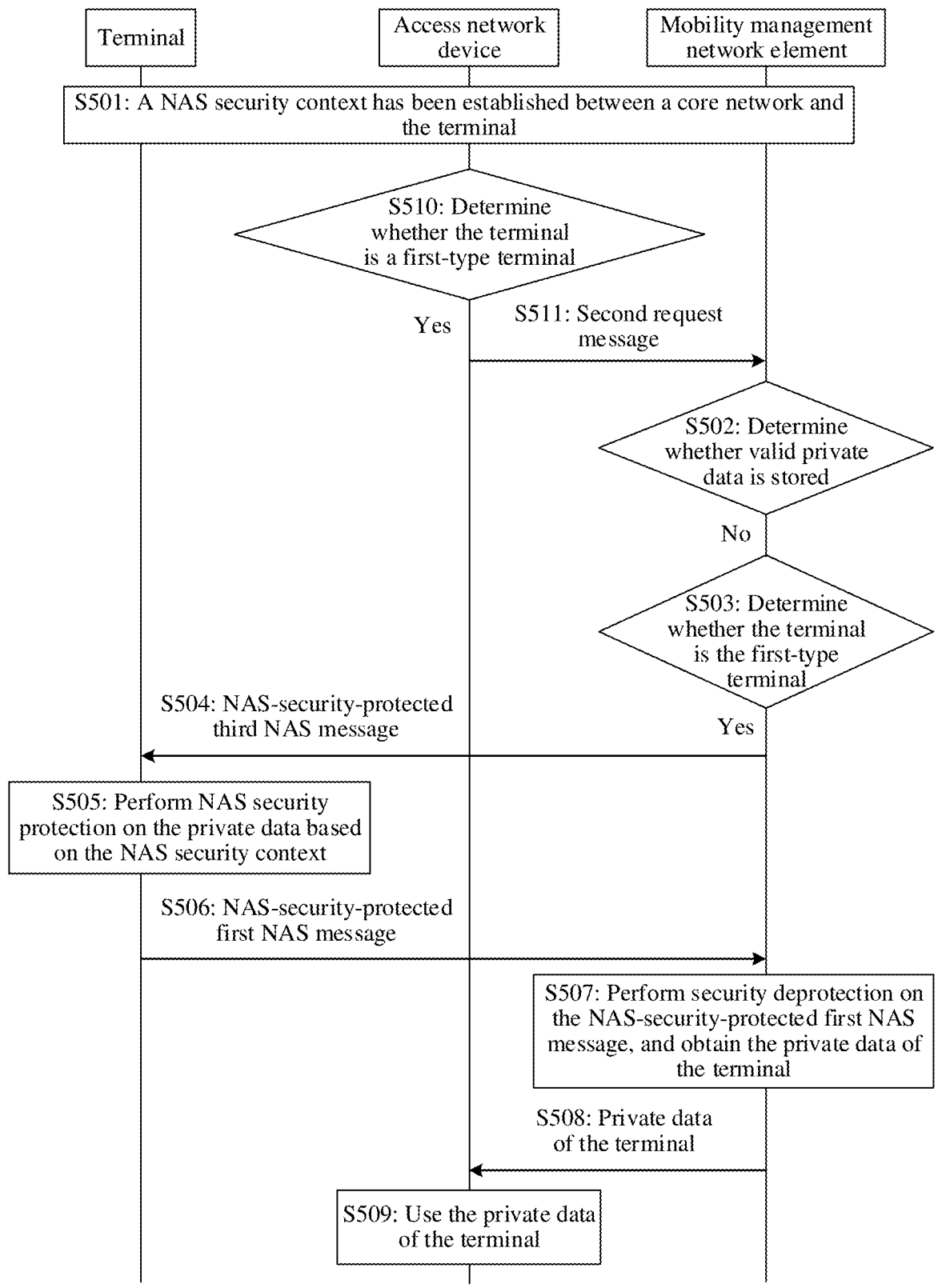

Based on the technical solution shown in FIG. 13(a), as shown in FIG. 13(b), the data transmission method further includes steps S510 and S511 before step S503.

S510: The access network device determines whether the terminal is the first-type terminal.

S511: The access network device sends a second request message to the mobility management network element, and the mobility management network element receives the second request message sent by the access network device.

S510 and S511 are the same as steps S405 and S406. For specific descriptions, refer to the foregoing description. Details are not described herein again.

Based on the technical solution shown in FIG. 13(b), when the access network device needs to obtain the private data of the terminal, the access network device may send a first request message to the mobility management network element, to obtain the private data of the terminal.

Figure 14:
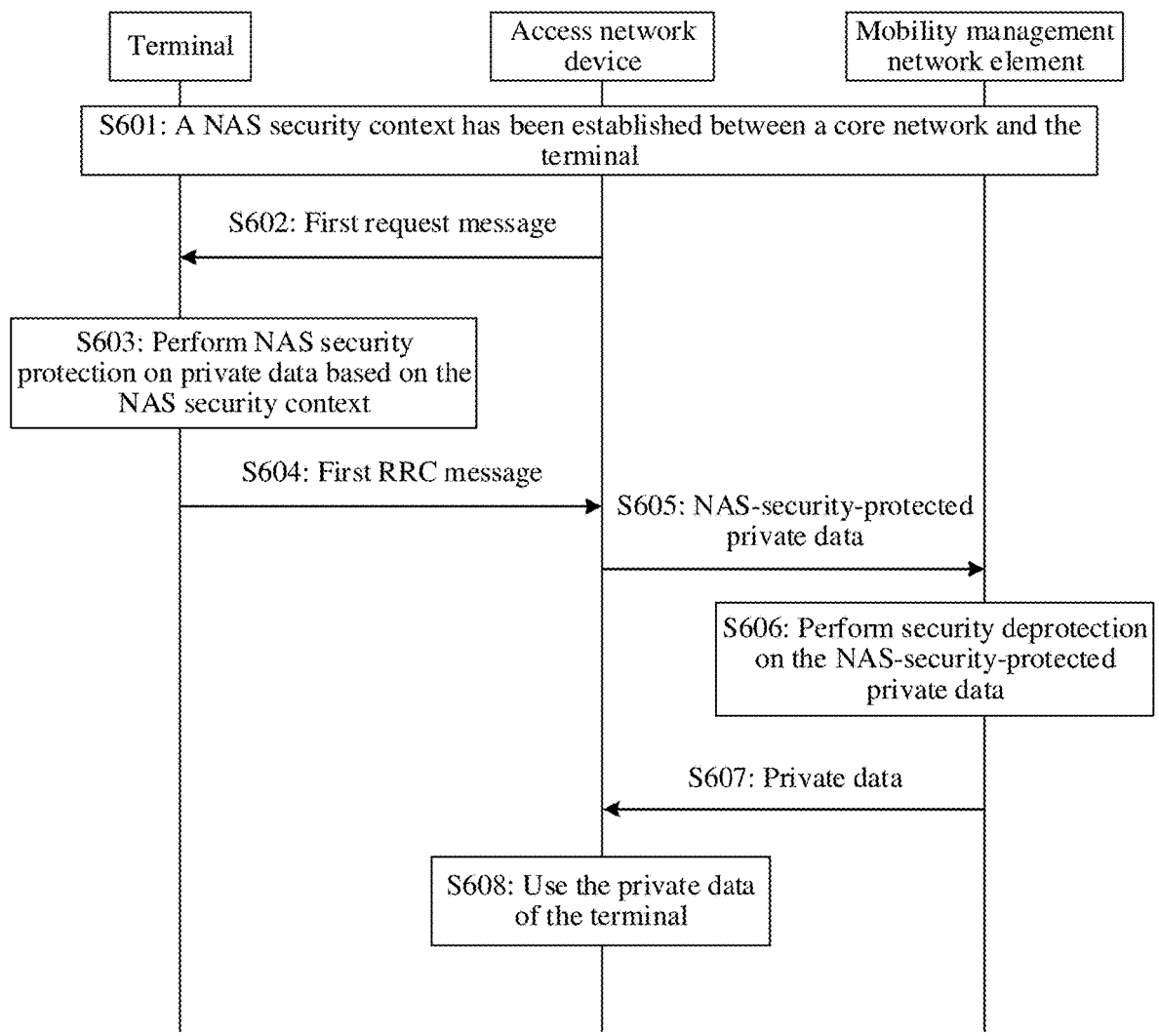
FIG. 14 is another flowchart of another data transmission method according to an embodiment of this application.

FIG. 14 shows a data transmission method according to an embodiment of this application. The method includes the following steps.

S601: A NAS security context has been established between a terminal and a core network.

S602: When an access network device needs to obtain private data of the terminal, the access network device sends a first request message to the terminal, and the terminal receives the first request message from the access network device.

S603: When the terminal is a first-type terminal, the terminal performs NAS security protection on the private data of the terminal based on the NAS security context.

S604: The terminal sends a first RRC message to the access network device, and the access network device receives the first RRC message. The first RRC message includes the NAS-security-protected private data.

Optionally, the first RRC message may carry second indication information, where the second indication information is used to indicate that the terminal is the first-type terminal.

S605: The access network device sends the NAS-security-protected private data to a mobility management network element.

In a possible implementation, when determining that the terminal is the first-type terminal, the access network device sends the NAS-security-protected private data to the mobility management network element.

S606: The mobility management network element performs security deprotection on the NAS-security-protected private data.

S607: The mobility management network element sends the private data of the terminal to the access network device, and the access network device receives the private data of the terminal.

S608: The access network device uses the private data of the terminal.

Figure 15:
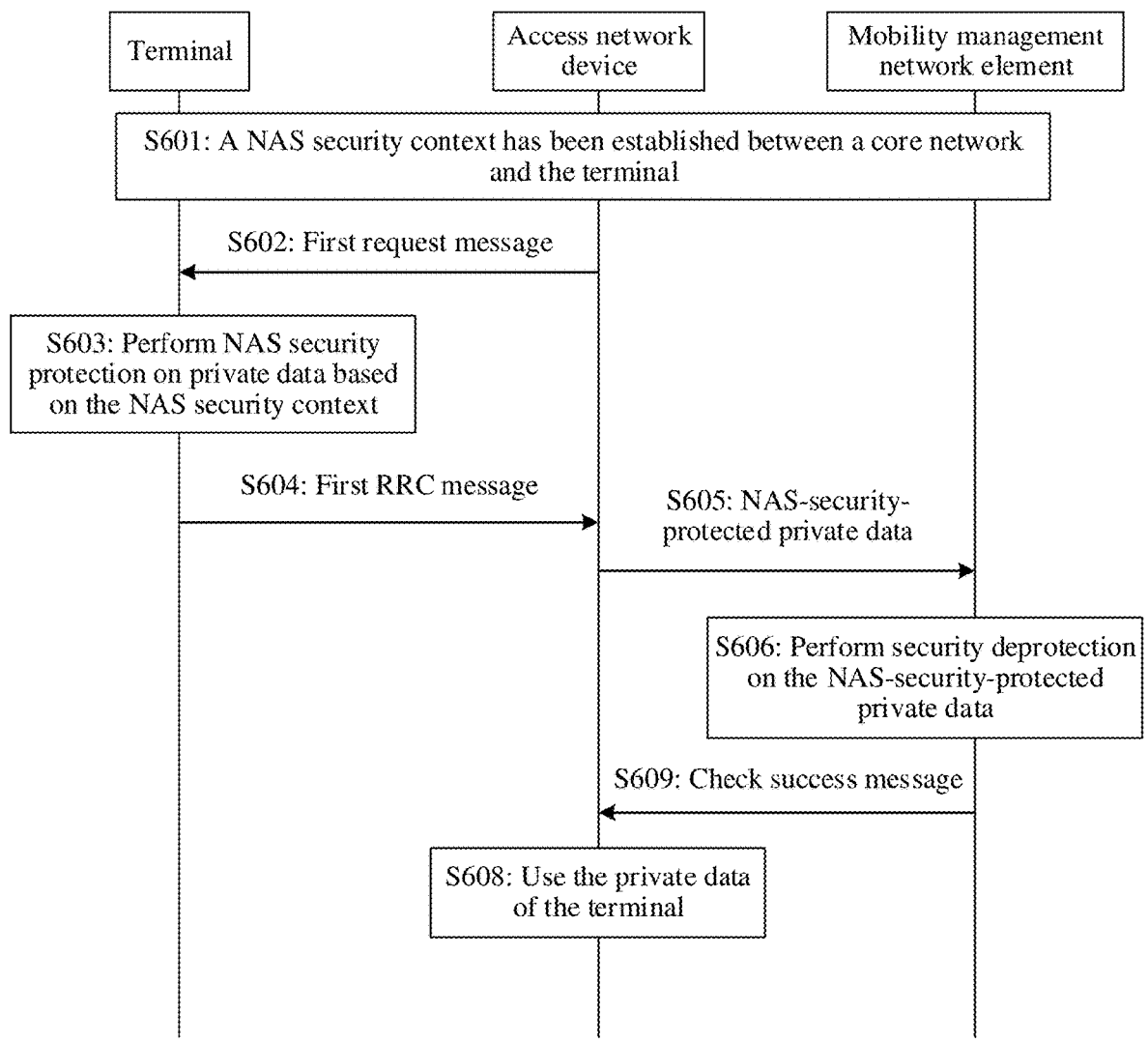
FIG. 15 is another flowchart of another data transmission method according to an embodiment of this application.

As shown in FIG. 15, when the first RRC message includes unencrypted private data, step S607 may be replaced with step S609.

S609: The mobility management network element sends a check success message to the access network device, and the access network device receives the check success message.

The check success message is used to indicate that first uplink NAS MAC is successfully checked.

Based on the technical solution shown in FIG. 14 or FIG. 15, a process of transmitting the private data between the access network device and the first-type terminal reuses a process in a conventional technology, thereby achieving good compatibility. In addition, in the first RRC message sent by the first-type terminal, the private data of the terminal is NAS security protected. This ensures security of the private data of the terminal in a transmission process.

Figure 16:
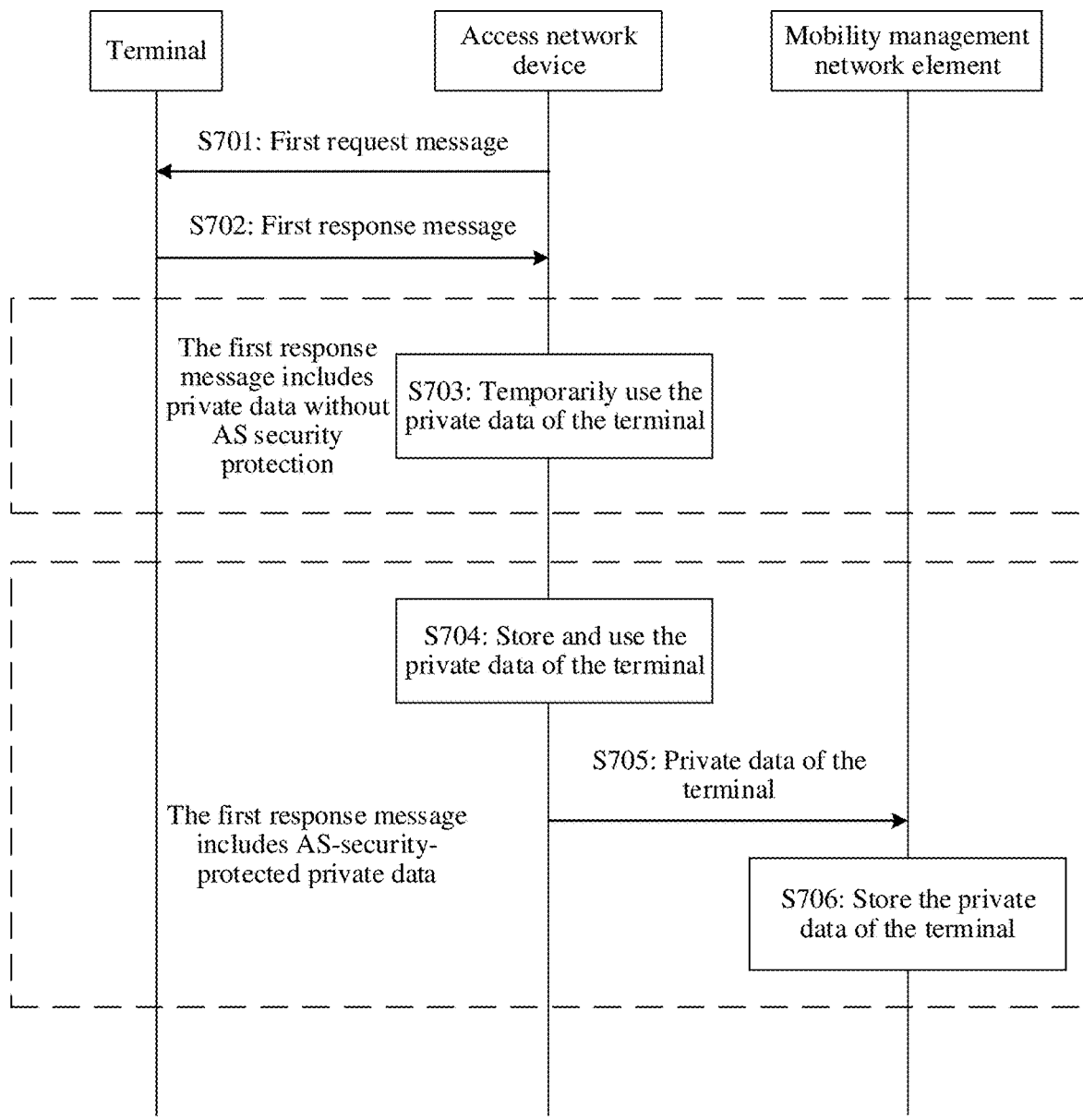
FIG. 16 is another flowchart of another data transmission method according to an embodiment of this application.

FIG. 16 shows a data transmission method according to an embodiment of this application. The method includes the following steps.

S701: When an access network device needs to obtain private data of a terminal, the access network device sends a first request message to the terminal, and the terminal receives the first request message from the access network device.

S702: The terminal sends a first response message to the access network device, and the access network device receives the first response message.

The first response message is used to respond to the first request message.

Optionally, when the terminal is a first-type terminal, the first response message includes private data without AS security protection. When the terminal is not the first-type terminal, the first response message includes AS-security-protected private data.

When the first response message includes the private data without AS security protection, the data transmission method includes the following step S703.

S703: The access network device temporarily uses the private data of the terminal.

It may be understood that the private data included in the first response message is prone to be tampered with if the first response message includes the private data without AS security protection. Therefore, the access network device only temporarily uses but does not store the private data of the terminal, to ensure security of a communication network.

In addition, when the private data is prone to be tampered with, if the access network device sends the private data to a mobility management network element, the mobility management network element may store private data that may be tampered with. In this case, in a subsequent procedure, private data of the terminal that is obtained by another access network device from the mobility management network element is all tampered with, causing large security risks to the communication network. To avoid this case, when the first response message includes the private data without AS security protection, the access network device does not send the private data of the terminal to the mobility management network element, to prevent the mobility management network element from storing the private data that may be tampered with.

When the first response message includes the AS-security-protected private data, the data transmission method includes the following steps S704 and S705.

S704: The access network device performs security deprotection on the AS-security-protected private data, and stores and uses the private data.

S705: After performing security deprotection on the AS-security-protected private data, the access network device sends the private data of the terminal to the mobility management network element, and the mobility management network element receives the private data of the terminal.

S706: The mobility management network element stores the private data of the terminal.

Based on the technical solution shown in FIG. 16, regardless of whether the terminal is the first-type terminal, the access network device obtains the private data of the terminal using a procedure in a conventional technology. In addition, when the first response message sent by the terminal does not carry the private data which is not AS security protected, the access network device only uses the private data temporarily, but does not send it to the mobility management network element, to reduce the security risks of the communication network.

Currently, in a TAU scenario, if the access network device needs to obtain the private data of the terminal, but the mobility management element does not store the private data of the terminal, the access network device requests the private data from the terminal. However, in the TAU scenario, the access network device does not have an AS security protection parameter. Therefore, the access network device cannot establish an AS security context with the terminal. Therefore, the terminal can send only the private data without AS security protection to the access network device. Because the private data is not AS security protected, the private data may be tampered with in a transmission process.

Figure 17:
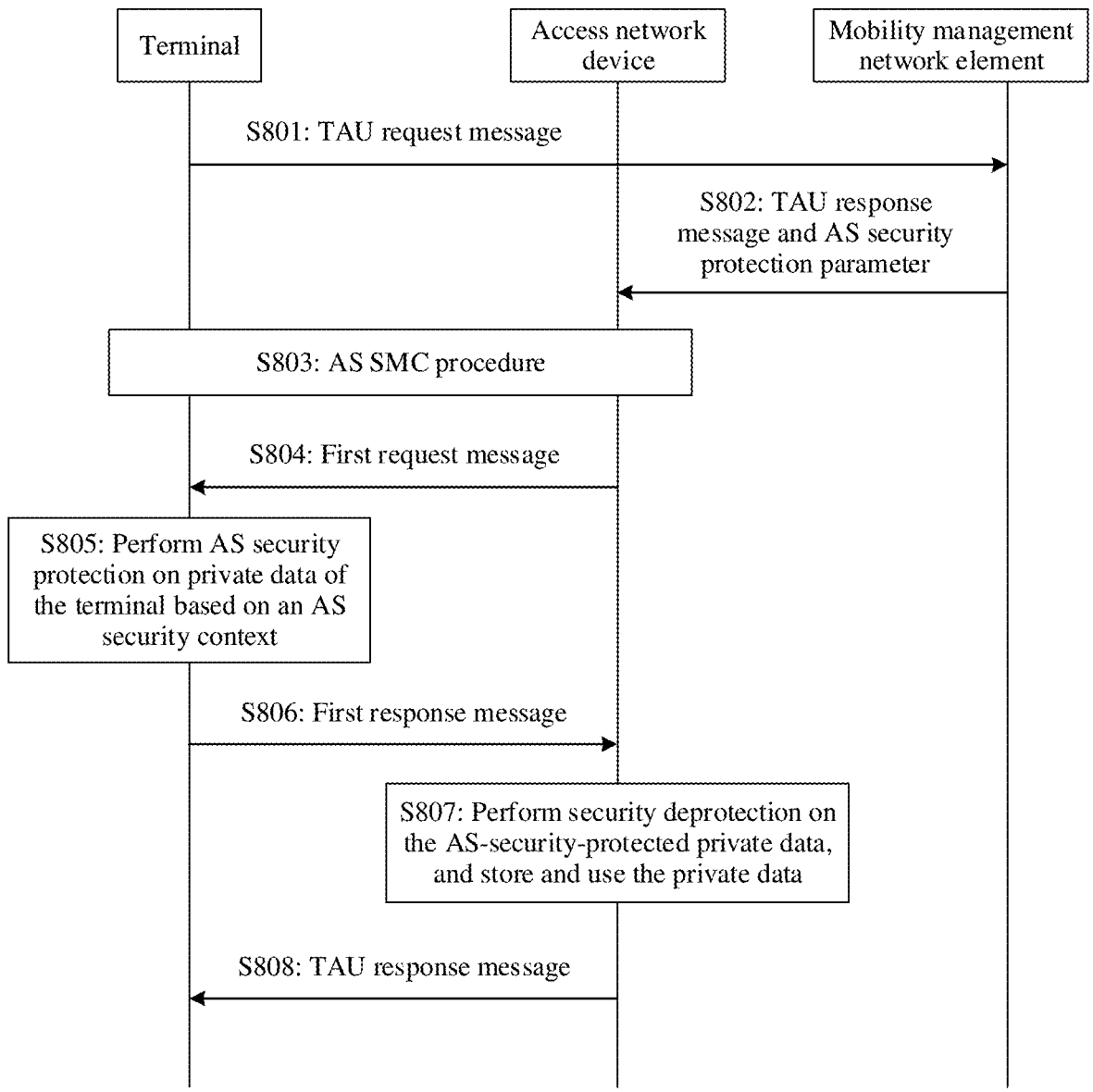
FIG. 17 is another flowchart of another data transmission method according to an embodiment of this application.

To resolve this technical problem, an embodiment of this application provides a data transmission method. As shown in FIG. 17, the data transmission method includes the following steps.

S801: A terminal sends a TAU request message to a mobility management network element, and the mobility management network element receives the TAU request message from the terminal.

The TAU request message is used to request to update a tracking area.

It may be understood that, in a process in which the terminal sends the TAU request message, an access network device is responsible for receiving the TAU request message sent by the terminal, and transparently transmitting the TAU request message to the mobility management network element.

S802: The mobility management network element sends a TAU response message and an AS security protection parameter to the access network device, and the access network device receives the TAU response message and the AS security protection parameter.

The AS security protection parameter is used to establish an AS security context between the access network device and the terminal. For example, the AS security protection parameter may be a KeNB.

In a possible implementation, when the access network device needs to obtain private data of the terminal, and the mobility management network element does not store the private data of the terminal, the mobility management network element sends the TAU response message and the AS security protection parameter to the access network device.

It may be understood that the TAU response message and the AS security protection parameter may be included in a same N2 message/S1 message or different N2 messages/S1 messages.

In this way, after receiving the AS security protection parameter, the access network device establishes the AS security context with the terminal based on the AS security protection parameter.

S803: An AS security mode command (security mode command, SMC) procedure is performed between the access network device and the terminal.

The AS SMC procedure is used to establish the AS security context between the access network device and the terminal. Specifically, the AS SMC procedure is used to negotiate a key and an algorithm used for integrity protection and encryption protection between the terminal and the access network device.

For example, the AS SMC procedure includes: The access network device sends an AS SMC message to the terminal, and then the terminal sends an AS SMP message to the access network device.

S804: The access network device sends a first request message to the terminal, and the terminal receives the first request message.

S805: The terminal performs AS security protection on the private data of the terminal based on the AS security context.

S806: The terminal sends a first response message to the access network device, and the access network device receives the first response message. The first response message includes the AS-security-protected private data.

S807: The access network device performs security deprotection on the AS-security-protected private data, and stores and uses the private data.

S808: The access network device transparently transmits, to the terminal, the TAU response message from the mobility management network element.

It should be noted that a sequence of performing step S808 and steps S803 to S807 is not limited in this embodiment of this application. For example, step S808 may be performed before steps S803 to S807, step S808 may be performed after steps S803 to S807, or step S808 and steps S803 to S807 may be performed simultaneously.

Based on the technical solution shown in FIG. 17, in the TAU procedure, the mobility management network element sends the AS security protection parameter to the access network device, so that the access network device can establish the AS security context with the terminal when the access network device needs to obtain the private data of the terminal. Therefore, the terminal may perform AS security protection on the private data, thereby ensuring security of the private data in a transmission process.

Figure 18:
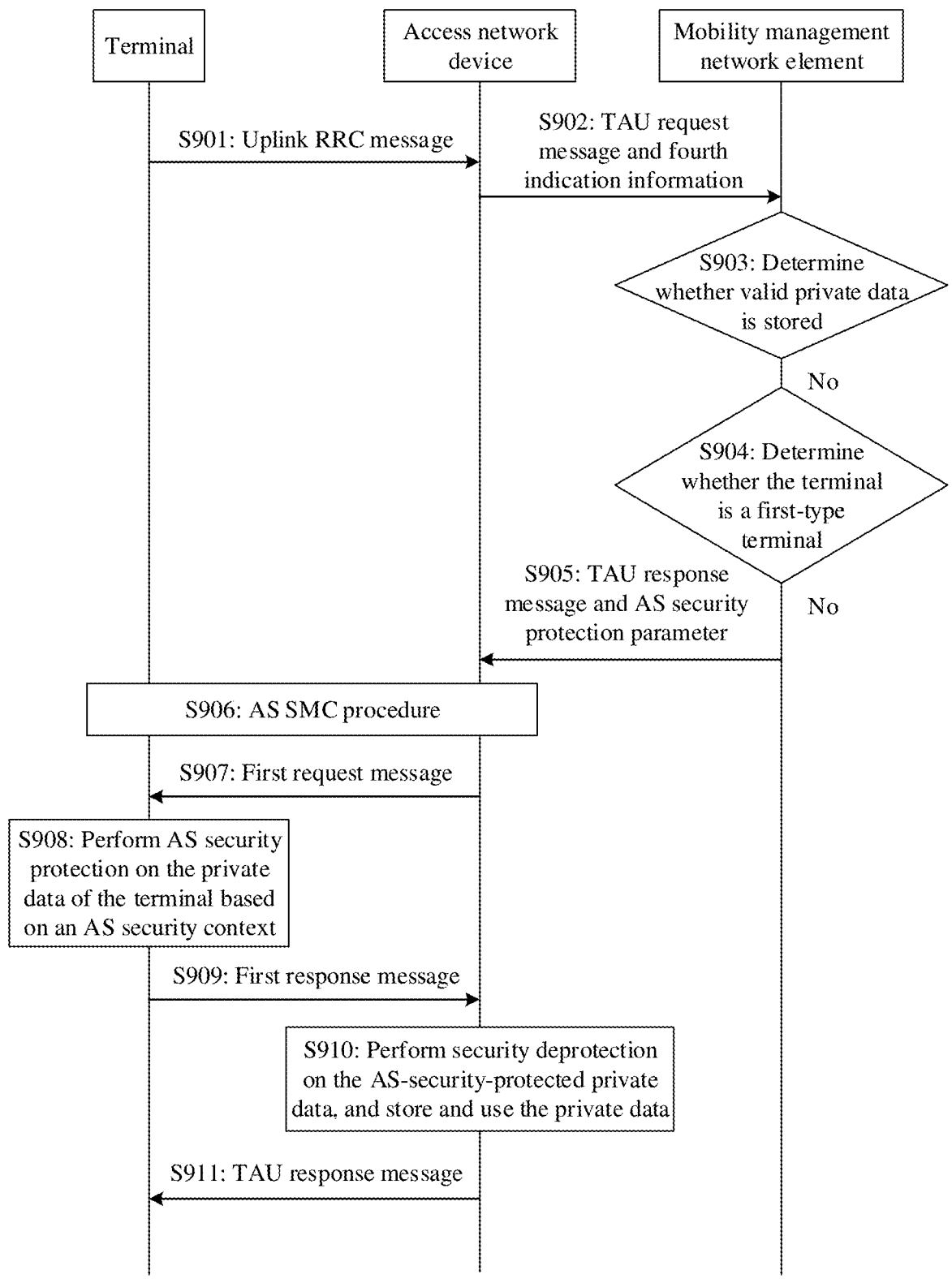
FIG. 18 is another flowchart of another data transmission method according to an embodiment of this application.

The following describes the technical solution shown in FIG. 18 in detail with reference to a specific application scenario.

FIG. 18 shows a data transmission method according to an embodiment of this application. The method includes the following steps.

S901: A terminal sends an uplink RRC message to an access network device, and the access network device receives the uplink RRC message.

The uplink RRC message includes terminal information and a TAU request message.

S902: When the access network device needs to obtain private data of the terminal, the access network device sends the TAU request message and fourth indication information to a mobility management network element.

The fourth indication information may be used to indicate that the access network device needs to obtain the private data of the terminal.

Optionally, the fourth indication information may be equivalent to the foregoing first request message.

It may be understood that the TAU request message and the fourth indication information may be carried in a same N2 message/S1 message. Alternatively, the TAU request message and the fourth indication information are carried in different N2 messages/S1 messages.

For example, in a TAU scenario, that the access network device needs to obtain the private data of the terminal includes: The access network device expects to learn whether the terminal supports NAS DC.

S903: When receiving the fourth indication information, the mobility management network element determines whether valid private data is stored.

When the mobility management network element stores the valid private data, the mobility management network element sends the private data of the terminal and a TAU response message to the access network device.

When the mobility management network element does not store the valid private data, the mobility management network element performs the following step S904.

S904: The mobility management network element determines whether the terminal is a first-type terminal.

When the terminal is the first-type terminal, the mobility management network element may send a third NAS message to the terminal, to trigger the terminal to report a first NAS message, so that the mobility management network element can obtain the private data of the terminal. After obtaining the private data of the terminal, the mobility management network element sends the private data of the terminal and the TAU response message to the access network device.

When the terminal is not the first-type terminal, the data transmission method may include the following steps S905 to S911.

S905 to S911 are the same as steps S802 to S808. For specific descriptions, refer to the foregoing description. Details are not described herein again.

The foregoing mainly describes the solutions in embodiments of this application from the perspective of interaction between network elements. It may be understood that, to implement the foregoing functions, each of the network elements, for example, the terminal, the access network device, and the mobility management network element, includes a corresponding hardware structure or software module for performing each function, or a combination thereof. A person skilled in the art should be easily aware that, in combination with the examples of units and algorithm steps described in embodiments disclosed in this specification, this application can be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

In embodiments of this application, the network device and the terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that in embodiments of this application, division into the modules is an example and is merely logical function division, and may be other division in an actual implementation. An example in which each function module is obtained through division based on each corresponding function is used below for description.

Figure 19:
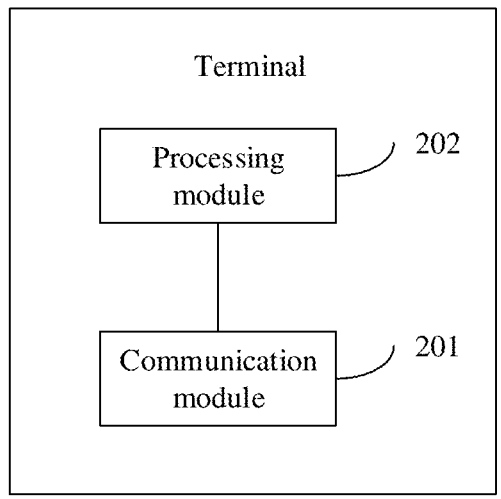
FIG. 19 is a schematic diagram of a structure of a terminal according to an embodiment of this application.

FIG. 19 is a schematic diagram of a structure of a terminal according to an embodiment of this application. The terminal includes a communication module 201 and a processing module 202. The communication module 201 is configured to support the terminal to perform step S102 in FIG. 9, steps S201 and S202 in FIG. 10, step S301 in FIG. 11, step S403 in FIG. 12, steps S504 and S506 in FIG. 13(a), steps S602 and S604 in FIG. 14, steps S701 and S702 in FIG. 16, steps S803, S804, and S806 in FIG. 17, steps S901, S906, S907, S909, and S911 in FIG. 18, and/or another communication operation that needs to be performed by the terminal in embodiments of this application. The processing module 202 is configured to support the terminal to perform step S101 in FIG. 9, step S402 in FIG. 12, step S505 in FIG. 13(a), step S603 in FIG. 14, step S805 in FIG. 17, step S908 in FIG. 18, and/or another processing operation that needs to be performed by the terminal in embodiments of this application.

In an example, with reference to the communication apparatus shown in FIG. 7, the processing module 202 in FIG. 19 may be implemented by the processor 101 in FIG. 7, and the communication module 201 in FIG. 19 may be implemented by the communication interface 104 in FIG. 7. This is not limited in embodiments of this application.

Figure 20:
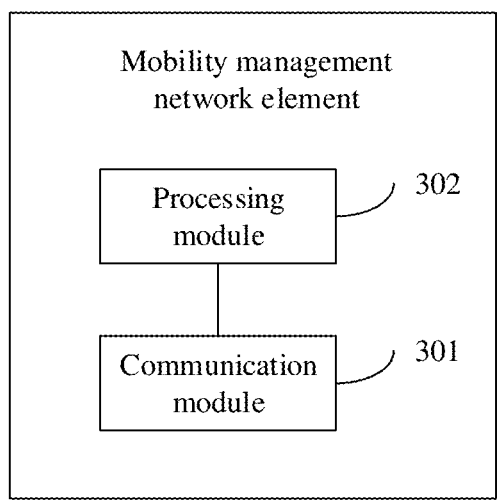
FIG. 20 is a schematic diagram of a structure of a mobility management network element according to an embodiment of this application.

FIG. 20 is a schematic diagram of a structure of a mobility management network element according to an embodiment of this application. The mobility management network element includes a communication module 301 and a processing module 302. The communication module 301 is configured to support the mobility management network element to perform step S102 in FIG. 9, steps S201 and S202 in FIG. 10, step S302 in FIG. 11, steps S403, S406, and S407 in FIG. 12, steps S504, S506, and S508 in FIG. 13(a), steps S511 in FIG. 13(b), steps S605 and S607 in FIG. 14, step S609 in FIG. 15, step S705 in FIG. 16, steps S801 and S802 in FIG. 17, steps S902 and S905 in FIG. 18, and/or another communication operation that needs to be performed by the mobility management network element in embodiments of this application. The processing module 302 is configured to support the mobility management network element to perform step S103 in FIG. 9, step S404 in FIG. 12, steps S502, S503, and S507 in FIG. 13(a), step S606 in FIG. 14, step S706 in FIG. 16, steps S903 and S904 in FIG. 9, and/or another processing operation that needs to be performed by the mobility management network element in embodiments of this application.

In an example, with reference to the communication apparatus shown in FIG. 7, the processing module 302 in FIG. 20 may be implemented by the processor 101 in FIG. 7, and the communication module 301 in FIG. 20 may be implemented by the communication interface 104 in FIG. 7. This is not limited in embodiments of this application.

Figure 21:
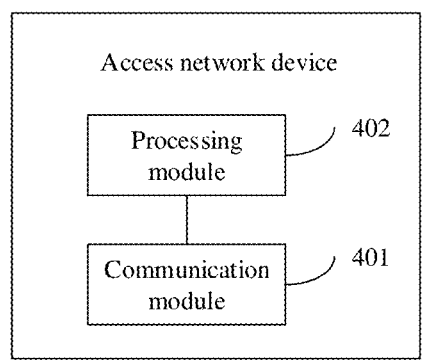
FIG. 21 is a schematic diagram of a structure of an access network device according to an embodiment of this application.

FIG. 21 is a schematic diagram of a structure of an access network device according to an embodiment of this application. The access network device includes a communication module 401 and a processing module 402.

The communication module 401 is configured to support the access network device to perform steps S301 and S302 in FIG. 11, steps S406 and S407 in FIG. 12, step S508 in FIG. 13(a), step S511 in FIG. 13(b), steps S602, S604, S605, and S607 in FIG. 14, step S609 in FIG. 15, steps S701, S702, and S705 in FIG. 16, steps S802, S803, S804, S806, and S808 in FIG. 17, steps S901, S905, S906, S907, S909, and S911 in FIG. 18, and/or another communication operation that needs to be performed by the access network device in embodiments of this application. The processing module 402 is configured to support the access network device to perform steps S405 and S408 in FIG. 12, step S509 in FIG. 13(a), step S510 in FIG. 13(b), step S608 in FIG. 14, steps S703 and S704 in FIG. 16, step S807 in FIG. 17, step S910 in FIG. 18, and/or another processing operation that needs to be performed by the access network device in embodiments of this application.

In an example, with reference to the communication apparatus shown in FIG. 7, the processing module 402 in FIG. 21 may be implemented by the processor 101 in FIG. 7, and the communication module 401 in FIG. 21 may be implemented by the communication interface 104 in FIG. 7. This is not limited in embodiments of this application.

An embodiment of this application further provides a computer-readable storage medium. The computer-readable storage medium stores instructions. When the computer-readable storage medium is run on a computer, the computer is enabled to perform the data transmission method in embodiments of this application.

An embodiment of this application further provides a computer program product including computer instructions. When the computer program product runs on a computer, the computer is enabled to perform the data transmission method in embodiments of this application.

An embodiment of this application provides a chip. The chip includes a processor. When the processor executes instructions, the chip is enabled to perform the data transmission method in embodiments of this application.

It should be understood that the computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

The foregoing descriptions about implementations allow a person skilled in the art to clearly understand that, for the purpose of convenient and brief description, division into only the foregoing function modules is used as an example for illustration. In actual application, the foregoing functions can be allocated to different function modules for implementation based on a requirement, that is, an inner structure of an apparatus is divided into different function modules to implement all or some of the functions described above.

It should be understood that in the several embodiments provided in this application, the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate components may or may not be physically separate, and components displayed as units may be one or more physical units, that is, may be located in one place, or may be distributed on a plurality of different places. Some or all of the units may be selected based on an actual requirement to achieve an objective of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions in embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication system, comprising an access network device and a mobility management network element, wherein
the access network device is configured to
send, before a terminal establishes an access stratum (AS) security context with the access network device, non-access stratum (NAS)-security-protected radio capability information of the terminal to the mobility management network element; and
receive radio capability information from the mobility management network element, wherein the radio capability information indicates a radio access technology supported by the terminal;
the mobility management network element is configured to
receive the NAS-security-protected radio capability information of the terminal from the access network device; and
send, to the access network device, the radio capability information obtained by performing security deprotection on the NAS-security-protected radio capability information;
the mobility management network element comprises a processor and a communication interface;
the access network device is further configured to, in response to determining that the terminal is a first-type terminal, send a second request message to the mobility management network element, wherein the second request message requests the radio capability information from the mobility management network element; and
the mobility management network element is further configured to receive the second request message, and send the radio capability information to the access network device in response to the second request message.

2. The communication system according to claim 1, wherein
the access network device is configured to receive a first NAS message from the terminal,
the NAS-security-protected radio capability information is carried in the first NAS message sent by the terminal, and
the first NAS message is NAS security protected.

3. The communication system according to claim 1, wherein
the first-type terminal is a control plane (CP)-optimized narrowband Internet of Things (NB-IoT) terminal or a CP-optimized cellular Internet of Things (CIOT) terminal.

4. The communication system according to claim 1, wherein
the mobility management network element is further configured to, in response to no valid radio capability information being stored, send a NAS-security-protected third NAS message to the terminal, wherein the third NAS message requests the NAS-security-protected radio capability information from the terminal.

5. The communication system according to claim 1, wherein
the access network device is further configured to
receive a first radio resource control (RRC) message from the terminal, wherein the first RRC message comprises a NAS container, and the NAS container comprises encrypted radio capability information and uplink NAS message authentication code (MAC); and
send the NAS container to the mobility management network element; and
the mobility management network element is configured to receive the NAS container.

6. A communication apparatus, comprising a processor and a communication interface, wherein the processor is configured to execute computer program instructions, to enable the communication apparatus to perform a process comprising:
receiving non-access stratum (NAS)-security-protected radio capability information;
performing, based on a prestored NAS security context, security deprotection on the NAS-security-protected radio capability information to obtain radio capability information;
storing the radio capability information, wherein the radio capability information indicates a radio access technology supported by a terminal;
receiving a second request message sent by an access network device, wherein the second request message requests the communication apparatus to send the radio capability information to the access network device; and
sending the radio capability information to the access network device in response to the second request message,
wherein the receiving the second request message from the access network device corresponds to the access network device determining that the terminal is a first-type terminal which has no AS security protection capability.

7. The communication apparatus according to claim 6, wherein
the receiving the NAS-security-protected radio capability information comprises receiving a first NAS message from the terminal,
the NAS-security-protected radio capability information is carried in the first NAS message sent by the terminal, and
the first NAS message is NAS security protected.

8. The communication apparatus according to claim 7, wherein the process further comprises:
sending, by the communication apparatus to the terminal, a NAS-security-protected second NAS message, wherein the second NAS message indicates that the communication apparatus has received the first NAS message.

9. The communication apparatus according to claim 6, wherein
the processor is configured to execute the computer program instructions to enable the communication apparatus to perform the process
after a NAS security context has been established between the terminal and a core network including the communication apparatus, and
before the terminal establishes an AS context with the access network device.

10. The communication apparatus according to claim 6, wherein
the first-type terminal is a control plane (CP)-optimized narrowband Internet of Things (NB-IoT) terminal or a CP-optimized cellular Internet of Things (CIOT) terminal.

11. A communication system, comprising an access network device and a mobility management network element, wherein a non-access stratum (NAS) security context is established between a terminal and a core network including the mobility management network element, and wherein
the access network device is configured to, before the terminal establishes an access stratum (AS) security context with the access network device,
receive a first message from the terminal, wherein NAS-security-protected radio capability information of the terminal is carried in the first message sent by the terminal, and the first message is NAS security protected, and
send the NAS-security-protected radio capability information of the terminal to the mobility management network element;
the mobility management network element is configured to, in response to receiving the NAS-security-protected radio capability information of the terminal from the access network device,
perform security deprotection on the NAS-security-protected radio capability information to obtain radio capability information of the terminal, wherein the radio capability information indicates a radio access technology supported by the terminal;
the access network device is configured to
determine whether the terminal is a first-type terminal which has no AS security protection capability to establish an AS security context with the access network device, and
in response to determining that the terminal is the first-type terminal, send a second request message to the mobility management network element, wherein the second request message requests the radio capability information of the terminal from the mobility management network element;
the mobility management network element is configured to, in response to receiving the second request message from the access network device,
send, to the access network device, the radio capability information of the terminal obtained by performing the security deprotection on the NAS-security-protected radio capability information;
the access network device is configured to, in response to receiving the radio capability information of the terminal from the mobility management network element, use the radio capability information of the terminal; and
the mobility management network element comprises a processor and a communication interface.

12. The communication system according to claim 11, wherein
the first-type terminal is a control plane (CP)-optimized narrowband Internet of Things (NB-IoT) terminal or a CP-optimized cellular Internet of Things (CIOT) terminal.

13. The communication system according to claim 12, wherein
the first message is a radio resource control (RRC) message from the terminal, wherein
the RRC message comprises a NAS container,
the NAS container comprises encrypted radio capability information and uplink NAS message authentication code (MAC), and
the access network device is configured to, without parsing the NAS container, send the NAS container to the mobility management network element; and
the mobility management network element is configured to
receive the NAS container from the access network device, and
perform the security deprotection on the NAS container.

14. The communication system according to claim 12, wherein
the first message is a radio resource control (RRC) message from the terminal, wherein
the RRC message comprises a NAS container,
the NAS container comprises unencrypted radio capability information and uplink NAS message authentication code (MAC), and
the access network device is configured to, without parsing the NAS container, send the NAS container to the mobility management network element; and
the mobility management network element is configured to
receive the NAS container from the access network device,
perform integrity check on the uplink NAS MAC, and
in response to the uplink NAS MAC being successfully integrity checked, send a check success message to the access network device, wherein the check success message indicates that the uplink NAS MAC is successfully integrity checked.

* * * * *